United States Patent
Kumar et al.

(10) Patent No.: US 8,720,344 B2
(45) Date of Patent: May 13, 2014

(54) THERMAL MANAGEMENT SYSTEM AND METHOD

(75) Inventors: Ajith Kuttannair Kumar, Erie, PA (US); John D. Butine, Erie, PA (US)

(73) Assignee: General Electric Company, Schenectady, NY (US)

( * ) Notice: Subject to any disclaimer, the term of this patent is extended or adjusted under 35 U.S.C. 154(b) by 330 days.

(21) Appl. No.: 13/219,954

(22) Filed: Aug. 29, 2011

(65) Prior Publication Data

US 2011/0308765 A1    Dec. 22, 2011

Related U.S. Application Data

(63) Continuation-in-part of application No. 11/745,137, filed on May 7, 2007, now Pat. No. 8,006,626.

(51) Int. Cl.
*B61C 5/02* (2006.01)
(52) U.S. Cl.
USPC ............................................. 105/49; 180/68.1
(58) Field of Classification Search
USPC .............. 180/68.1, 68.2, 65.1, 54.245, 65.31, 180/65.27, 68.5; 105/48.3, 49, 50, 27, 105/26.05, 59; 454/2, 57, 58, 69, 159, 244, 454/251, 258, 272; 165/104.28
See application file for complete search history.

(56) References Cited

U.S. PATENT DOCUMENTS

| | | | |
|---|---|---|---|
| 3,084,866 A * | 4/1963 | Keightley ................. 237/12.3 R |
| 5,355,690 A * | 10/1994 | Iritani et al. .................... 62/184 |
| 5,493,870 A * | 2/1996 | Kodama et al. ................. 62/155 |
| 5,937,664 A * | 8/1999 | Matsuno et al. ............. 62/259.2 |
| 6,220,383 B1 * | 4/2001 | Muraki et al. ............... 180/68.5 |
| 6,302,228 B1 * | 10/2001 | Cottereau et al. ............ 180/68.1 |
| 6,435,264 B1 * | 8/2002 | Konno et al. .................... 165/41 |
| 6,662,892 B2 * | 12/2003 | Falk et al. ..................... 180/68.1 |
| 6,781,349 B2 * | 8/2004 | Kimura et al. ................ 320/150 |
| 7,045,236 B1 * | 5/2006 | Andrew et al. .................. 429/83 |
| 7,441,414 B2 * | 10/2008 | Ziehr et al. ..................... 62/244 |
| 7,647,788 B2 * | 1/2010 | Okuda et al. ................. 62/259.2 |
| 7,735,331 B2 * | 6/2010 | Zhu et al. ..................... 62/259.2 |
| 7,770,525 B2 * | 8/2010 | Kumar et al. .................... 105/51 |
| 7,921,946 B2 * | 4/2011 | Kumar ........................ 180/65.29 |
| 8,006,626 B2 * | 8/2011 | Kumar et al. .................... 105/49 |
| 8,395,355 B2 * | 3/2013 | Kaita et al. .................... 320/134 |
| 2001/0005991 A1 * | 7/2001 | Niimi et al. ..................... 62/133 |
| 2002/0043413 A1 | 4/2002 | Kimishima et al. |

(Continued)

FOREIGN PATENT DOCUMENTS

WO    2007027020 A1    3/2007

*Primary Examiner* — Katy M Ebner
*Assistant Examiner* — Brodie Follman
(74) *Attorney, Agent, or Firm* — GE Global Patent Operation; John A. Kramer

(57) ABSTRACT

A system includes an interior duct, a blower, a vent coupling, and a secondary duct. The interior duct is fluidly coupled with the inlet and with an energy storage device disposed in a vehicle. The blower draws cooling fluid received through the inlet and through the interior duct to cause a first portion of the cooling fluid to flow over and/or through the energy storage device. The vent coupling directs the first portion of the cooling fluid that flowed over and/or through the energy storage device into a vented area. The secondary duct directs a second portion of the cooling fluid from the interior duct into the vent coupling to mix with the first portion of the cooling fluid after the first portion of the cooling fluid flows over and/or through the energy storage device.

21 Claims, 12 Drawing Sheets

(56) References Cited

U.S. PATENT DOCUMENTS

| | | |
|---|---|---|
| 2006/0075766 A1* | 4/2006 | Ziehr et al. .................. 62/186 |
| 2006/0080986 A1* | 4/2006 | Inoue .......................... 62/259.2 |
| 2006/0196954 A1* | 9/2006 | Okuda et al. ................ 236/49.3 |
| 2008/0276631 A1* | 11/2008 | Kumar et al. ................ 62/118 |
| 2008/0276632 A1* | 11/2008 | Kumar ......................... 62/118 |
| 2008/0277101 A1* | 11/2008 | Kumar et al. ............. 165/104.28 |
| 2008/0277185 A1* | 11/2008 | Kumar et al. ................ 180/313 |
| 2008/0293277 A1* | 11/2008 | Kumar et al. ................ 439/247 |
| 2009/0176150 A1* | 7/2009 | Yanaka ........................ 429/120 |
| 2009/0249803 A1* | 10/2009 | Suzuki et al. ................ 62/56 |
| 2009/0260905 A1* | 10/2009 | Shinmura .................... 180/68.1 |
| 2009/0277707 A1* | 11/2009 | Ballard ........................ 180/68.2 |
| 2010/0043470 A1* | 2/2010 | Kang et al. .................. 62/239 |
| 2010/0089547 A1* | 4/2010 | King et al. ................... 165/42 |
| 2010/0112419 A1* | 5/2010 | Jang et al. ................... 429/62 |
| 2011/0105004 A1* | 5/2011 | Browne et al. .............. 454/75 |
| 2011/0214930 A1* | 9/2011 | Betts et al. ................... 180/65.1 |
| 2011/0269387 A1* | 11/2011 | Leffert et al. ................ 454/75 |
| 2011/0308765 A1* | 12/2011 | Kumar et al. ................ 165/47 |
| 2012/0079836 A1* | 4/2012 | Oh et al. ...................... 62/3.3 |

* cited by examiner

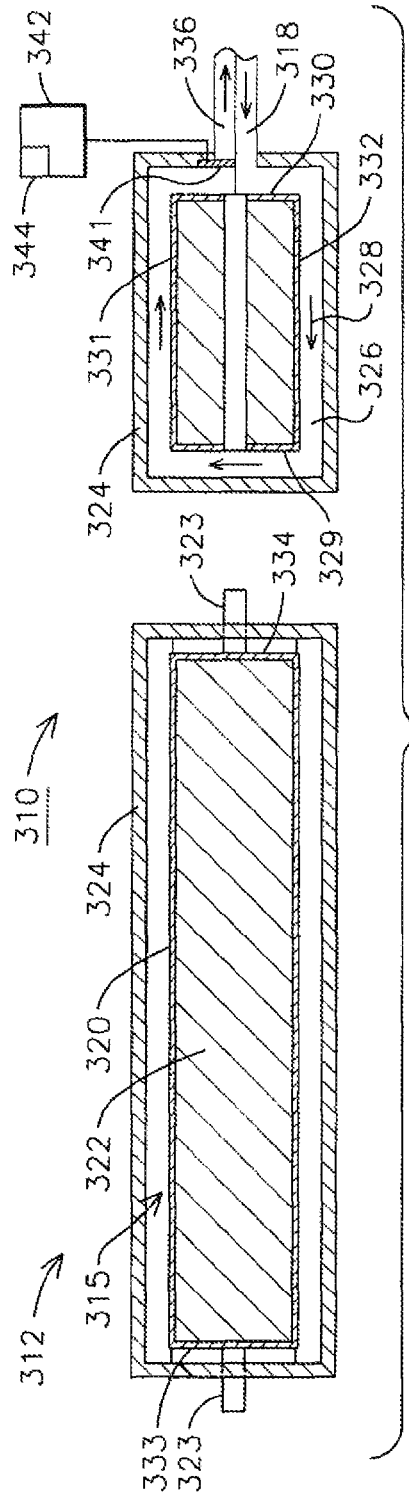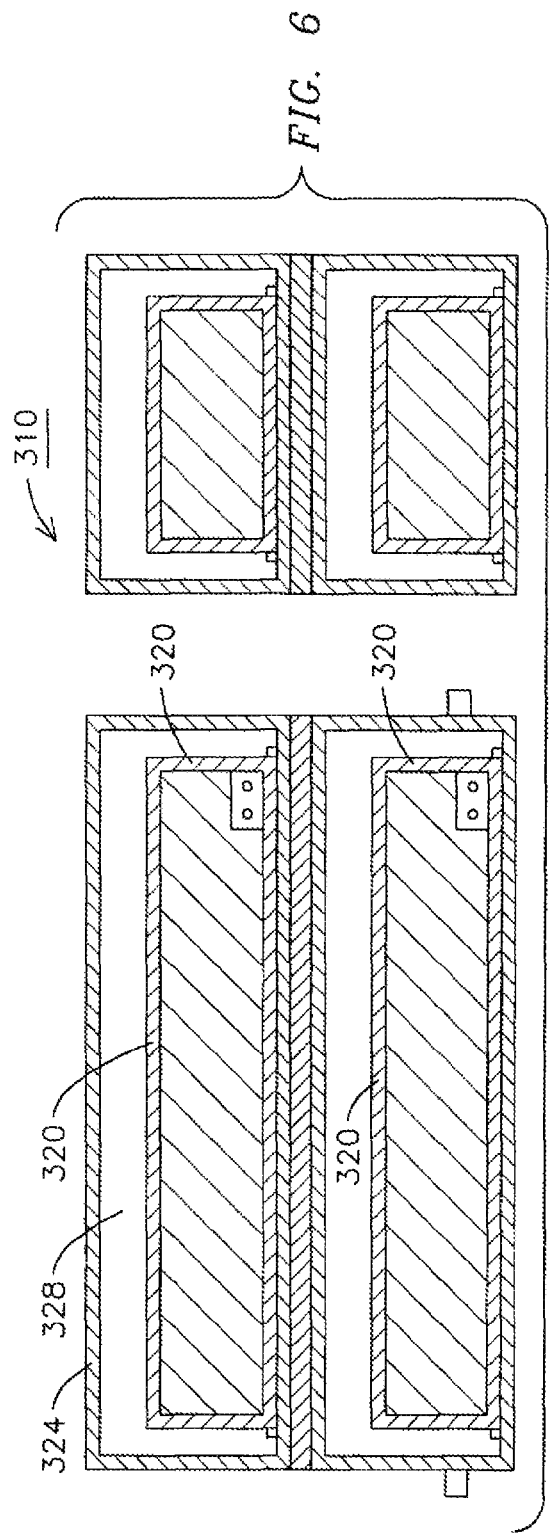
FIG. 5
FIG. 6

THERMAL MANAGEMENT SYSTEM AND METHOD

CROSS-REFERENCE TO RELATED APPLICATIONS

This application is a continuation-in-part of U.S. patent application Ser. No. 11/745,137, which is titled "System And Method For Cooling A Battery" and was filed on 7 May 2007 (the "'137 Application"). The entire disclosure of the '137 Application is incorporated herein by reference.

BACKGROUND

1. Technical Field

The invention relates to energy storage applications, and more particularly, to a system and method for thermal management of an energy storage system.

2. Discussion of Art

Hybrid energy diesel electric vehicles, such as hybrid energy diesel electric locomotives, for example, include an energy storage system with several energy storage devices (e.g., batteries). These energy storage devices are typically utilized to store secondary electric energy during a dynamic braking mode, when the traction motors generate excess electrical energy which may be stored, or during a motoring mode, when the locomotive engine produces excess electrical energy which may be stored. Each locomotive typically includes many energy storage devices, such as between ten and fifty, for example, where each energy storage device is a large, massive body including several hundred individual cells combined together, and each energy storage device amounts to several hundred pounds in weight.

A conventional cooling system 200 for a plurality of energy storage devices 202 of a current locomotive is illustrated in FIG. 1. Each energy storage device 202 is positioned beneath a locomotive platform, and a respective motor-driven blower 204 and accompanying wire mesh 206 (or screen) are individually coupled to each energy storage device 202 beneath the locomotive platform. During operation of the cooling system 200, each blower/motor 204 draws outside air from beneath the locomotive platform through the respective wire mesh 206 and over a respective energy storage device 202, before expelling the outside air through a respective exhaust vent 208. Accordingly, the conventional cooling system 200 provides a respective blower/motor 204 for each energy storage device 202 which draws in outside air from beneath the locomotive platform, possibly including contaminants such as rocks, pebbles, dust and other debris from beneath the locomotive platform. Additionally, the conventional cooling system 200 provides an individual blower/motor 204, wire mesh 206, and exhaust vent 208 for each energy storage device 202.

Accordingly, it would be advantageous to provide a cooling system for the energy storage devices of a locomotive which improves the air quality of the incoming outside air to the cooling system. Additionally, it would be advantageous to provide a cooling system for the energy storage devices of a locomotive that reduces the number of blowers/motors for easier control and/or maintenance of the cooling system.

BRIEF DESCRIPTION

In one embodiment, a system includes an interior duct, a blower, a vent coupling, and a secondary duct. The interior duct is configured to be fluidly coupled with an inlet that receives a cooling fluid into a vehicle and with an energy storage device disposed in the vehicle. The blower is configured to be fluidly coupled with the interior duct to draw the cooling fluid through the interior duct and to cause a first portion of the cooling fluid to flow at least one of over or through the energy storage device. The vent coupling is configured to be fluidly coupled with the energy storage device and a vented area of the vehicle. The vent coupling also is configured to direct the first portion of the cooling fluid that flowed at least one of over or through the energy storage device into the vented area. The secondary duct is configured to be fluidly coupled with the vent coupling and with the interior duct. The secondary duct is configured to direct a second portion of the cooling fluid from the interior duct into the vent coupling to mix with the first portion of the cooling fluid after the first portion of the cooling fluid has flowed at least one of over or through the energy storage device.

In another embodiment, a method includes fluidly connecting an interior duct with an inlet and an energy storage device disposed in a vehicle. The inlet is configured to receive a cooling fluid into the vehicle. The method also includes fluidly connecting a blower with the interior duct so that the blower is positioned to draw the cooling fluid through the interior duct and to cause a first portion of the cooling fluid to flow at least one of over or through the energy storage device. The method further includes fluidly connecting a vent coupling with the energy storage device and a vented area of the vehicle. The vent coupling is configured to direct the first portion of the cooling fluid that flowed at least one of over or through the energy storage device into the vented area. The method also includes fluidly connecting a secondary duct with the vent coupling and with the interior duct. The secondary duct is configured to direct a second portion of the cooling fluid from the interior duct into the vent coupling to mix with the first portion of the cooling fluid after the first portion of the cooling fluid has flowed at least one of over or through the energy storage device.

In another embodiment, another system includes a controller that is configured to be coupled with a blower that draws a cooling fluid through a duct of a vehicle and at least one of over or through an energy storage device in the vehicle. The controller is configured to be coupled with a temperature sensor that monitors a temperature of the energy storage device. The controller also is configured to activate or deactivate the blower to control flow of the cooling fluid at least one of over or through the energy storage device based on the temperature of the energy storage device.

In another embodiment, a system is provided for thermally managing an energy storage system of an electric or hybrid electric vehicle. The energy storage system includes at least one energy storage device. The system includes an inlet positioned on the outer surface of the vehicle above a platform of the vehicle. Additionally, the system includes a cooling fluid duct in flow communication with the inlet and the at least one energy storage device. The system further includes a blower powered by a respective motor and positioned within the cooling fluid duct to draw cooling fluid into the inlet and through the cooling fluid duct to pass the cooling fluid over or through the at least one energy storage device and into a common vented area of the vehicle.

In another embodiment, a method is provided for cooling an energy storage system of a hybrid electric vehicle. The energy storage system includes at least one energy storage device. The method includes positioning an inlet on the outer surface of the vehicle above the platform of the vehicle. Additionally, the method includes communicatively coupling a cooling fluid duct to the inlet and the at least one energy storage device, followed by positioning a blower powered by a motor within the cooling fluid duct. The method subsequently involves drawing cooling fluid into the inlet and through the cooling fluid duct, followed by passing the cooling fluid over or through the at least one energy storage device and into a common vented area of the vehicle.

In another embodiment, computer readable media containing program instructions are provided for cooling an energy storage system of a hybrid electric vehicle. The energy storage system includes at least one energy storage device. The computer readable media includes a computer program code to selectively control the supply of cooling fluid into an inlet positioned on the outer surface of the vehicle above the platform of the vehicle and through a cooling fluid duct in flow communication with the inlet and each energy storage device. Additionally, the computer readable media includes a computer program code to selectively control the passage of the cooling fluid over or through the at least one energy storage device and into a common vented area of the vehicle.

BRIEF DESCRIPTION OF THE DRAWINGS

A more particular description of the embodiments of the invention briefly described above will be rendered by reference to specific embodiments thereof that are illustrated in the appended drawings. Understanding that these drawings depict embodiments of the invention and are not therefore to be considered to be limiting of its scope, the embodiments of the invention will be described and explained with additional specificity and detail through the use of the accompanying drawings in which:

FIG. 5 is a cross-sectional side view and cross-sectional end view of an embodiment of a system for cooling an energy storage device of a hybrid electric vehicle;

FIG. 6 is a cross-sectional side view and cross-sectional end view of an embodiment of a system for cooling an energy storage system of a hybrid electric vehicle;

DETAILED DESCRIPTION

Though exemplary embodiments of the invention are described with respect to vehicles, specifically hybrid vehicles having diesel engines. The exemplary embodiments of the invention discussed below are also applicable for other uses. These other uses may include hybrid diesel electric mining equipment (such as off-highway vehicles), marine vessels, stationary units, automobiles (such as cars, passenger busses, and the like), one or more of which may use a diesel engine or other type of engine for propulsion and an energy storage system with one or more energy storage devices. As used herein, outside air and cooling air drawn into an air inlet and through an air duct are examples of suitable cooling fluids, but in other embodiments a suitable cooling fluid may be selected based on application specific criteria.

Figure 1:
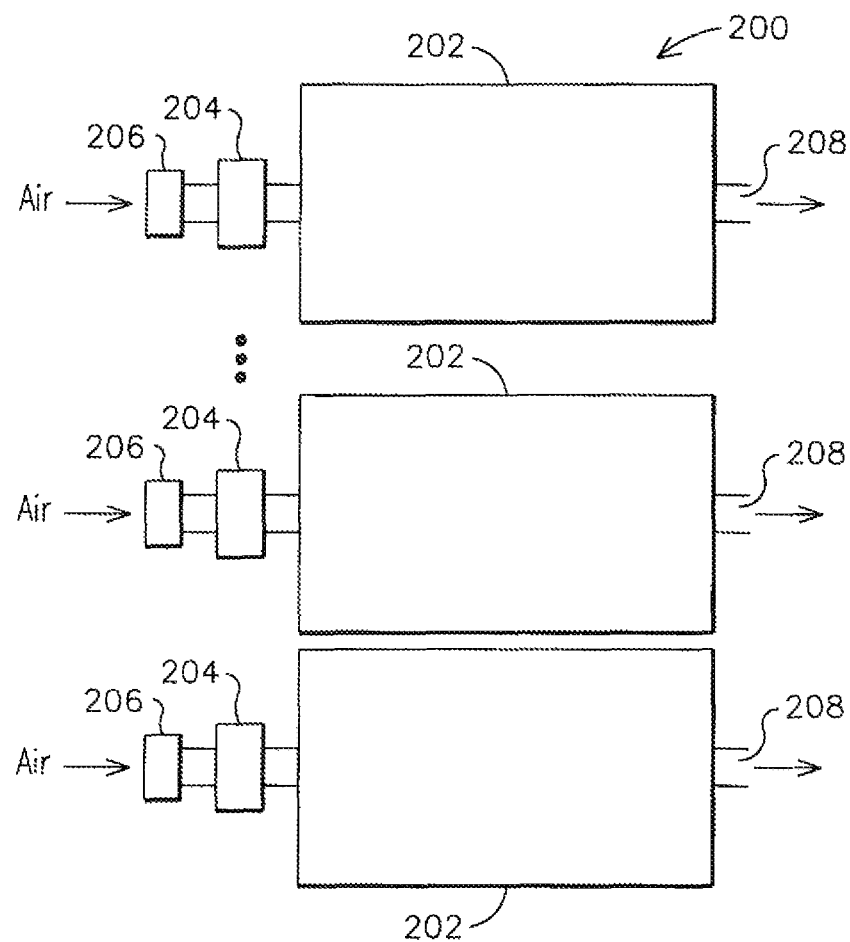
FIG. 1 is a cross-sectional top view of an embodiment of a conventional system for cooling an energy storage system of a hybrid electric vehicle.
Figure 2:
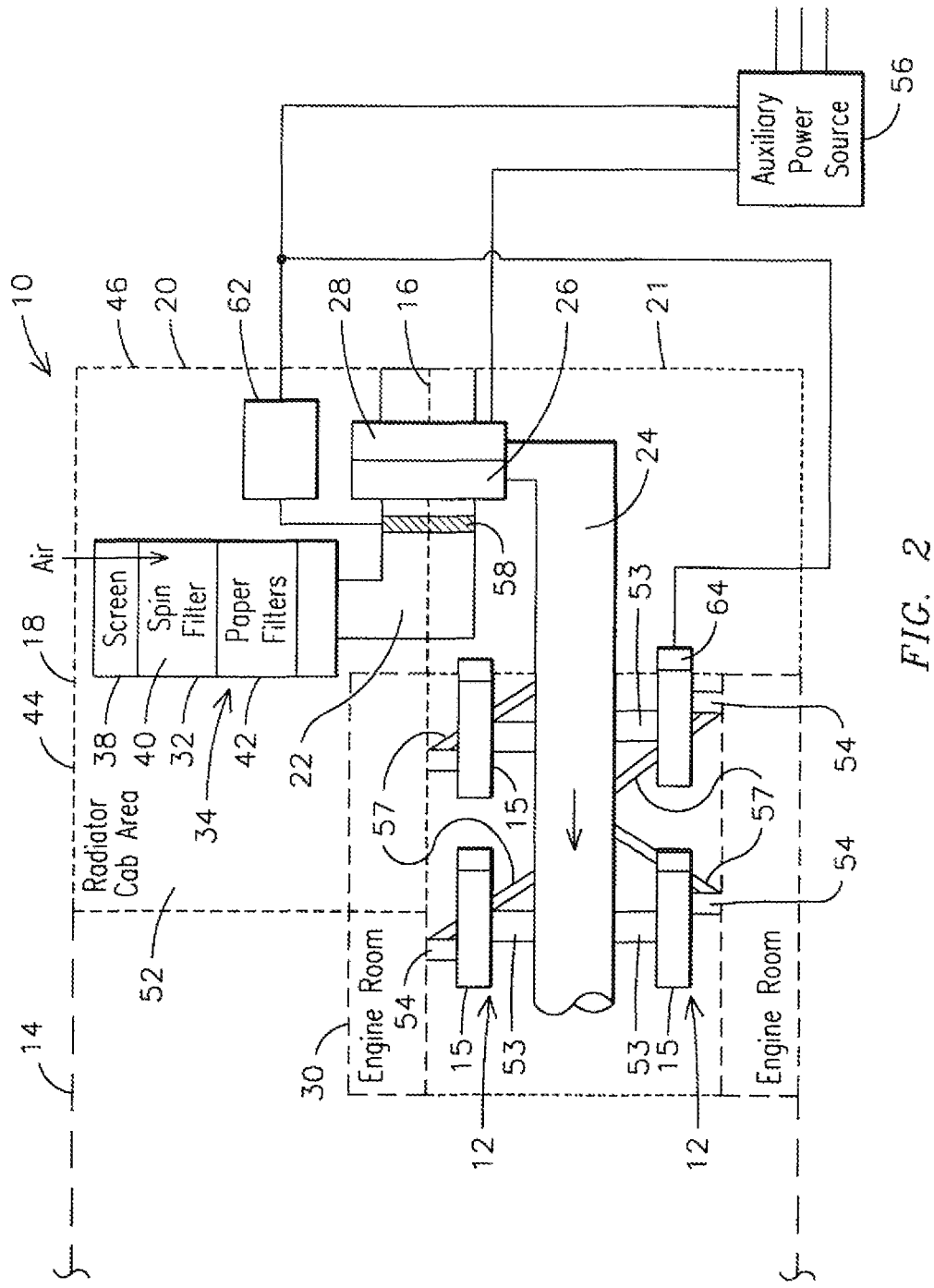
FIG. 2 is a cross-sectional plan view of an embodiment of a system for cooling an energy storage system of a hybrid electric vehicle.

FIG. 2 illustrates one embodiment of a system 10 for cooling an energy storage system 12 of a vehicle 14. The vehicle 14 may represent a hybrid diesel electric locomotive, or another type of powered device capable of self propulsion. The energy storage system 12 illustratively includes a plurality of energy storage devices (i.e. batteries) 15 positioned below a platform 16 of the locomotive 14. The platform 16 represents a horizontal or substantially horizontal surface (e.g., closer to being parallel to a surface upon which the vehicle 14 travels than to being perpendicular to the surface) that can support one or more components, passengers, or operators of the vehicle 14. For example, the platform 16 may represent a floor or may support a floor upon which an operator of the vehicle 14 is positioned to control the vehicle 14. Although FIG. 2 illustrates the energy storage devices 15 positioned below the platform 16, the energy storage devices 15 may be positioned above or on the platform 16, such as for a tender application. In an exemplary embodiment of the system 10, the platform 16 of the vehicle 14 is positioned above the wheels or other components of the vehicle 14 that engage the surface upon which the vehicle 14 travels and is substantially aligned with the floor of an operator cabin for each vehicle 14. Alternatively, the platform 16 may be aligned with other horizontal surfaces of the vehicle 14 other than the operator cabin.

In the illustrated exemplary embodiment of FIG. 2, the system 10 includes an air inlet 18 positioned on an outer surface 20 of the vehicle 14 above the platform 16 at a location relatively free from or having a relatively low concentration of contaminants or emissions, including diesel fumes, hot air exhaust, etc. The air inlet 18 can include an opening in the outer surface 20 of the vehicle 14 adjacent to a radiator area 52 of the vehicle 14, with dimensions based upon the particular energy storage system 12 and the cooling air flow demand for each energy storage system 12. Although FIG. 2 illustrates the air inlet 18 positioned in an opening of the outer surface 20 adjacent to the radiator area 52, the air inlet 18 may be positioned in an opening of the outer surface 20 adjacent to another area of the vehicle 14 and/or above the platform 16. In an additional exemplary embodiment, the air inlet 18 may be positioned at a location along the outer surface 20, 21, above or below the platform 16, provided that the incoming outside air into the inlet 18 includes a minimum or reduced amount of contaminants, emissions, or other components. By positioning the air inlet 18 along the outer surface 20 of the vehicle 14 above the platform 16, outside air drawn into the air inlet includes a substantially less amount of contaminants relative to outside air adjacent to an outer surface 21 of the vehicle 14 below the platform 16. Although FIG. 2 illustrates an air inlet 18 positioned on a roof portion 44 of the outer surface 20 of the vehicle 14, the air inlet may be positioned at any location along the outer surface 20 of the vehicle 14 above the platform 16, including at any location on the roof portion 44 or side portions 46 of the outer surface 20 above the platform 16. Additionally, although FIG. 2 illustrates one air inlet 18 positioned in the outer surface 20 of the vehicle 14 above the platform 16, more than one air inlet 18 may be positioned in the outer surface 20 of the vehicle 14.

As further illustrated in the exemplary embodiment of FIG. 2, one or more filtering media 32 are positioned at a filtering location 34 adjacent to the inlet 18 within an inlet duct 22. The filtering media 32 assist in removing contaminants from the outside air drawn into the air inlet 18 before the drawn outside air enters the inlet duct 22. Although FIG. 2 illustrates a variety of filtering media 32, including more than one filtering layers, such as a screen 38, a spin filter 40 and a paper filter 42, one or more other types of filtering media may be utilized. Additionally, since the exemplary embodiment of the system 10 features placement of the air inlet 18 along the outer surface 20 of the vehicle 14 above the platform 16, the amount of contaminants in the incoming outside air through the inlet 18 may be relatively low, thereby reducing or minimizing the need for excessive filtering, and/or extending the life of filter and battery components. Screen filters 38 may be placed as a first filtering layer encountered by incoming outside air to remove large objects, such as leaves and paper, for example. Spin filters 40 may be placed as a second filtering layer for the incoming outside air to separate matter based upon density using an air spinning centrifuge device, for example. Additionally, paper filters 42 may be utilized as an additional filtering layer to collect additional particles from the outside air during the filtering process, for example. Since the exemplary embodiment of the system 10 features a single filtering location 34 for all filtering media 32, regular maintenance including regular replacement and/or cleaning of each filtering media may be conveniently accomplished at the single filtering location, as oppose to at multiple filtering locations.

As further illustrated in the exemplary embodiment of FIG. 2, the system 10 includes the inlet duct 22 and an interior air duct or interior duct 24 in flow communication with the inlet 18. While the inlet 18, the inlet duct 22, and the interior duct 24 are referred to in one embodiment as an air inlet, an air inlet duct, and/or an interior air duct, one or more of the inlet 18, the inlet duct 22, and/or the interior duct 24 may be conduits that direct the flow of a fluid other than air, such as another gas, liquid, or combination thereof. The filtering media 32 is disposed between the inlet duct 22 and the inlet 18. The interior duct 24 is coupled to the inlet duct 22 through a blower 26 and motor 28 (discussed below) and/or a damper control device 58 (discussed below). Although FIG. 2 illustrates a blower 26 and respective motor 28, each blower 26 may be directed driven by a mechanical source, or each blower 26 may be driven by a second blower which in turn may be driven by a mechanical source. While the inlet duct 22 is illustratively positioned above the platform 16 and the interior duct 24 is illustratively positioned below the platform 16, the inlet duct 22 and/or the interior duct 24 are not limited to being respectively positioned above and below the platform 16. Additionally, although FIG. 2 illustrates one inlet 18, one inlet duct 22, and one interior duct 24, more than one inlet 18 may be positioned along the outer surface, and/or for which more than one respective inlet duct 22 and/or interior duct 24 may be utilized.

The interior duct 24 illustrated in the exemplary embodiment of FIG. 2 passes along the length of the vehicle 14, and is in flow communication with each energy storage device 15 below the platform 16. Although FIG. 2 illustrates four energy storage devices 15 positioned on opposite sides of the interior duct 24, another number of energy storage devices may be in flow communication with the interior duct 24, including on opposite sides of the interior duct 24 or on one side of the interior duct 24, for example. Additionally, although FIG. 2 illustrates one interior duct 24 positioned below the platform 16, more than one interior duct 24 may be positioned below the platform 16, and/or more than one set of energy storage devices 15 may be in flow communication with each respective interior duct 24.

As further illustrated in the exemplary embodiment of FIG. 2, the system 10 includes a blower 26 powered by a motor 28 positioned within the inlet duct 22. During operation, upon supplying power to the motor 28 and activating the blower 26, the blower draws cooling fluid, such as outside air (e.g., air from outside the vehicle 14), from above the platform 16 into the inlet 18, through the filtering media 32 at the single filtering location 34 and through the inlet duct 22 and the interior duct 24. Alternatively, the blower 26 may include or represent a pump that changes an interior pressure inside one or more of the inlet duct 22 and/or the interior duct 24 to draw and/or push another cooling fluid, such as a gas and/or liquid, through the inlet duct 22 and/or the interior duct 24. The blower 26 subsequently passes the outside air or other cooling fluid over or through each energy storage device 15 and into a common vented area 30 of the vehicle 14. In the illustrated exemplary embodiment of FIG. 2, the common vented area 30 is an engine compartment area, which may receive a substantial amount of heat from the locomotive engine. The blower 26 forces the outside air or other cooling fluid through a duct coupling 53 to pass the outside air or other cooling fluid over or through one or more of the energy storage devices 15 and further draws the outside air or other cooling fluid through a respective vent coupling 54 to the engine compartment 30. The engine compartment 30 can include one or more pre-existing vents (not shown) along the outer surface 20 of the vehicle 14, to exhaust the cooling fluid or outside air outside the vehicle 14 upon entering the engine compartment 30. Although FIG. 2 illustrates one blower 26 and a respective motor 28, more than one blower and/or respective motor may be utilized within each duct, or alternatively one blower and respective motor may be positioned within each of a plurality of ducts, as discussed above.

As illustrated in the exemplary embodiment of FIG. 2, a secondary duct 57 is illustratively coupled between the interior duct 24 and each vent coupling 54 between each energy storage device 15 and the engine compartment area 30. The secondary duct 57 is provided to pass cooler cooling fluid (such as outside air) from the interior duct 24 into each vent coupling 54, to blend the cooler cooling fluid (such as outside air) with hotter outside air having passed over or through each energy storage device 15 and into each vent coupling 54. Within each vent coupling 54, the cooler cooling fluid (such as outside air) from each air duct 24 blends with the hotter cooling fluid (such as air or cooling fluid that has passed over or through one or more of the energy storage devices 15), thereby reducing the temperature of the cooling fluid passed to the engine compartment area 30. Additionally, in an exemplary embodiment, a secondary duct 57 may be positioned to blend cooler cooling fluid from the interior duct 24 with a respective vent external to the vehicle (not shown). In the exemplary embodiment of utilizing the secondary duct, a greater amount of cooler cooling fluid such as outside air may be blended with the hotter cooling fluid (such as outside air) having passed over or through one or more, or each, energy storage device when the cooling fluid is exhausted outside of the vehicle.

As illustrated in the exemplary embodiment of FIG. 2, the system 10 includes a power source 56 to supply power to the blower 26 and motor 28. In the exemplary embodiment, the power source 56 is an auxiliary power source to supply power to the blower 26 and motor 26 to draw the outside air into the inlet 18, through the filtering media 32, through the inlet duct 22 and the interior duct 24, to pass the cooling fluid or outside air over or through each energy storage device 15 and into the common vented area 30 of the vehicle 14. In an exemplary embodiment, the blower 26 is operated continuously to avoid non-rotation of the blower motor for an extended period of time during operation of the vehicle 14 to prevent failure of a motor bearing of the blower 26 due to mechanical vibrations during the operation of the vehicle 14.

In addition to the power source 56, a damper control device 58 may be positioned within the air inlet duct 22 to selectively shut off the supply of cooling fluid or outside air to the blower 26. The damper control device 58 may be controlled by a controller 62, and is switchable between an open (cooling fluid or outside air supply flows to the blower 26) and closed (cooling fluid or outside air supply is shut off to the blower 26) position. The controller 62 is illustratively coupled to the damper control device 58, and may switch the damper control device between the open and closed position based upon the temperature of one or more of the energy storage devices 15, which the controller may read from a respective temperature sensor 64, such as a thermometer, for example, of one or more of the energy storage devices also coupled to the controller. Additionally, the controller 62 may switch the damper control device to an intermediate position between the open and closed position, to control the supply of outside air flowing to the blower 26. To increase or maximize the efficiency of the system 10, the controller 62 may switch the damper control device 58 to the closed position, such that the blower continues to rotate (assuming the motor is receiving power) but no cooling fluid or outside air is supplied to the blower, thereby reducing or minimizing the work done by the blower. In an exemplary embodiment, the operating temperature range of the energy storage device may be between 270-330 degrees Celsius, for example, however, the controller may turn the damper control device to the closed position upon reading a lower or minimum temperature of 270 degrees Celsius from one or more of the energy storage devices, and shut off the supply of cooling fluid or outside air to the blower, thereby shutting off the cooling system, for example. The exemplary temperature range of 270-330 degrees Celsius is merely an example, and energy storage devices may operate at varying temperature ranges. Additionally, the controller may turn the damper control device to the open position upon reading an increased or maximum temperature of 300 degrees Celsius from one or more of the energy storage devices, and reopen the supply of cooling fluid or outside air to the blower to recommence the cooling system, for example. Although FIG. 2 illustrates one power source and damper control device, more than one power source and more than one damper control device may be utilized. Although the illustrated power source 56 is an auxiliary power source, the motor 28 may be powered by a vehicle engine power source. The controller 62 is included in the illustrated exemplary embodiment of the system 10 to monitor a temperature sensor 64 coupled to each energy storage device 15. In addition to selectively operating the damper control system, the controller 62 may selectively operate a continuous speed blower, a multiple speed blower of the speed of the power source 56, a variable speed blower/direct driven blower or a switchable blower. The controller 62 may selectively operate each blower based upon comparing a monitored temperature from the temperature sensor 64 of one or more of the energy storage devices 15 with a respective predetermined temperature threshold stored in a controller memory.

The blower 26 may be a continuous speed blower, a multiple speed blower of the speed of the power source 56, or a switchable blower including a switch to turn the blower on and off. For example, the multiple speed blower may operate at multiple speeds (i.e. ½, ¼, ⅛, etc) of the speed of the power source to the blower, or a variable speed drive like an inverted driven motor.

Figure 3:
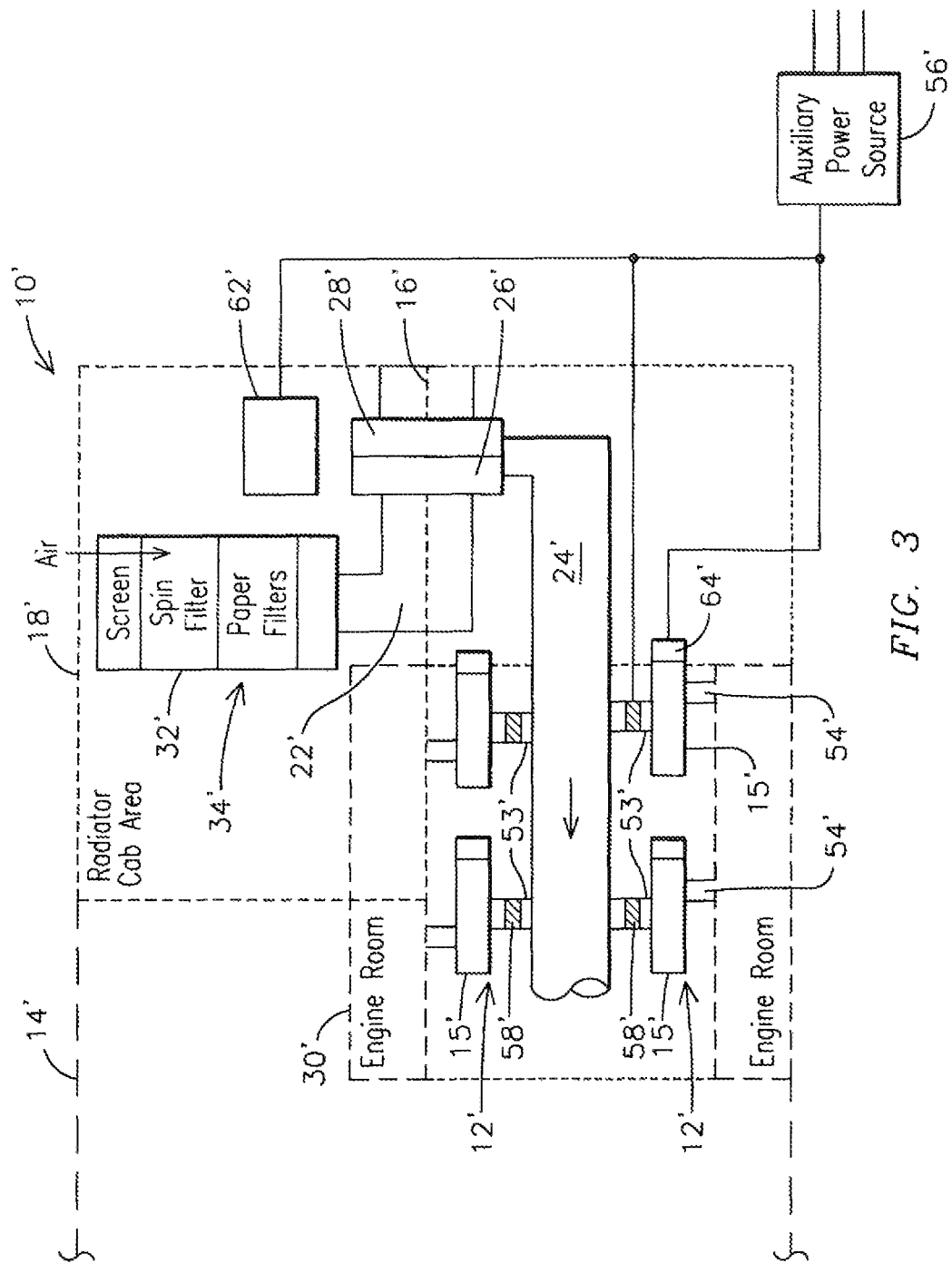
FIG. 3 is a cross-sectional plan view of an embodiment of a system for cooling an energy storage system of a hybrid electric vehicle.

FIG. 3 illustrates another embodiment of a system 10' for cooling an energy storage system 12'. The system 10' includes an inlet duct 22' and an interior duct 24' in flow or fluid communication to an inlet 18'. As illustrated in the exemplary embodiment of FIG. 3, the system 10' includes a power source 56' to controllably operate the blower 26' and motor 28'. In the exemplary embodiment, the power source 56' includes an auxiliary power source to controllably operate the blower 26' and motor 28' to draw cooling fluid, such as outside air, into the inlet 18', through the filtering media 32' and through the inlet duct 22' and the interior duct 24'. Upon passing through the interior duct 24', the cooling fluid passes through a respective damper control device 58' positioned within the duct coupling 53' from the interior duct 24' to one or more of the energy storage devices 15'. Each damper control device 58' is positioned within the duct coupling 53' adjacent to each energy storage device 15' to selectively shut off the supply of cooling fluid to one or more of the energy storage devices. Each damper control device 58' may be controlled by a controller 62' to selectively shut off the supply of cooling fluid over or through one or more of the energy storage devices 15', through a respective vent coupling 54' and into a common vented area 30', such as the engine compartment, for example. Each damper control device 58' is switchable by the controller 62' between an open (where cooling fluid flows to each energy storage device 15') and closed (where cooling fluid is shut off or prevented from flowing to one or more of the energy storage devices 15') position. Additionally, the controller 62' may switch the damper control device 58' to an intermediate position between the open and closed positions, to selectively control the supply of cooling fluid provided to one or more of the energy storage devices 15'. The controller 62' is illustratively coupled to each damper control device 58', and may switch the damper control device between the open and closed position based upon the temperature of one or more of the energy storage devices 15', which can be read from a respective temperature sensor 64' of one or more of the energy storage devices that is also coupled to the controller. In an exemplary embodiment, the operating temperature range of the energy storage device may be 270-330 degrees Celsius, however the controller may turn the damper control device to the closed position upon reading a lower or minimum temperature of 270 degrees Celsius from each of the energy storage devices, and shut off the supply of cooling fluid to the energy storage device. The example of a temperature range of 270-330 degrees Celsius is merely exemplary and energy storage devices may operate at varying temperature ranges. Additionally, the controller may turn the damper control device to the open position upon reading a lower or minimum temperature of 300 degrees Celsius from one or more of the energy storage devices, and reopen the supply of cooling fluid to one or more of the energy storage devices. Although FIG. 3 illustrates one power source and one damper control device for each energy storage device, more than one power source and more than one damper control device for each energy storage device may be utilized. Although the illustrated power source 56' is an auxiliary power source, the motor 28' may be powered by a vehicle engine power source. Those other elements of the system 10' not discussed herein, are similar to those elements of the previous embodiments discussed above, without prime notation, and require no further discussion herein.

Figure 4:
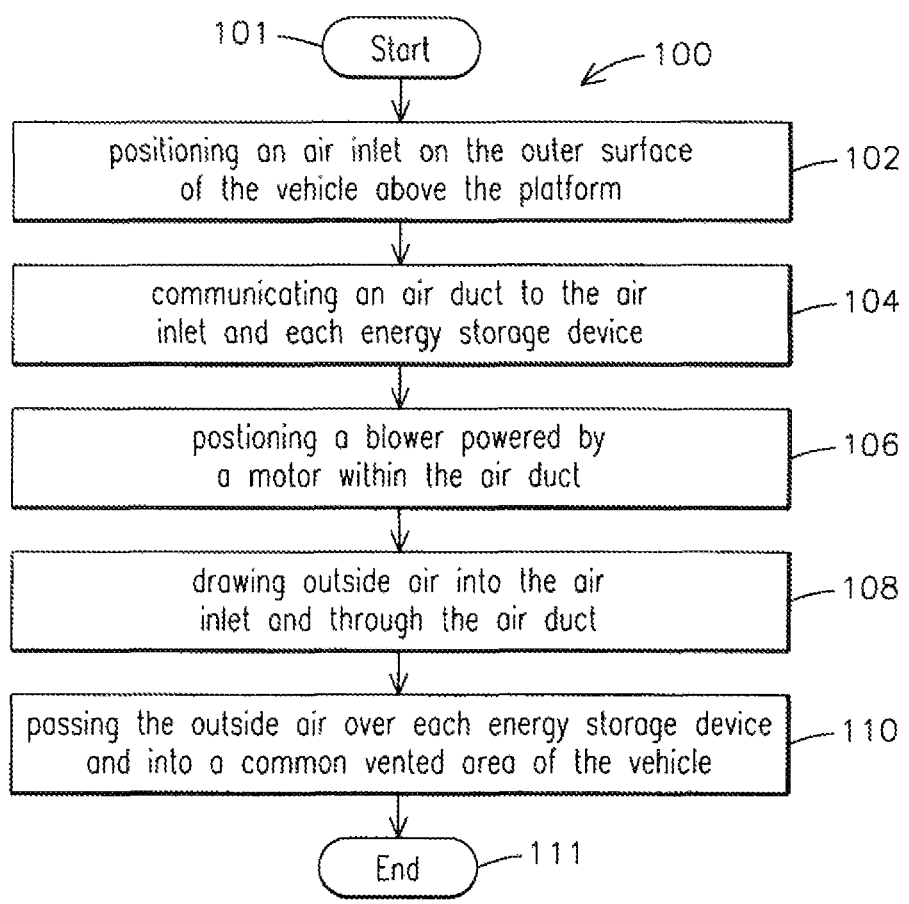
FIG. 4 is a flow chart illustrating an exemplary embodiment of a method for cooling an energy storage system of a hybrid electric vehicle.

FIG. 4 illustrates an exemplary embodiment of a method 100 for cooling an energy storage system 12 of a vehicle 14, such as an automobile, bus, hybrid diesel electric locomotive, or other vehicle capable of self-propulsion. The energy storage system 12 includes a plurality of energy storage devices 15 positioned below a platform 16 of the vehicle 14. The energy storage devices 15 may be similarly positioned above the platform 16 of the vehicle 14. The method 100 begins (block 101) by positioning (block 102) an inlet on the outer surface of the vehicle above the platform. More particularly, the method includes communicating (block 104) an interior duct to the air inlet and each energy storage device. Additionally, the method includes positioning (block 106) a blower powered by a motor within the air duct. The method further includes drawing (block 108) cooling fluid, such as outside air, into the inlet and through the interior duct, followed by passing (block 110) the cooling fluid over or through one or more of the energy storage devices and into a common vented area of the vehicle, before ending at block 111.

The method may further include providing filtering media 32 at a filtering location 34 adjacent to or near the inlet 18 within an inlet duct 22 in flow communication to the interior duct 24, where the filtering media 32 may include a filtering screen 38, a spin filter 40, a paper filter 42, and/or another type of filtering media. Additionally, the method may further include removing contaminants from the cooling fluid (e.g., outside air) before entering the air inlet duct 18. The method may further include positioning a damper control device 58 within the inlet duct 22 to selectively shut off the supply of cooling fluid to one or more of the energy storage devices 15.

FIG. 5 illustrates an additional embodiment of a system 310 for cooling an energy storage system 312, where the energy storage system 312 includes one or more energy storage devices 315. Although FIG. 5 illustrates one energy storage device, the system 310 may be utilized with a plurality of energy storage devices 315, as illustrated in FIG. 6.

The system 310 illustratively includes an inner casing 320 configured to encapsulate an inner core 322 of the energy storage device 315 of the energy storage system 312. The inner core 322 of the energy storage device 315 includes one or more, or all, components of the energy storage device, with the ducts, inlets, and outlets removed. The inner casing 320 can form an air-tight containment around the inner core 322 of the energy storage device 315, and may be a heavy-duty box, for example. The inner casing 320 may be formed from a suitable metallic material, such as stainless steel. One or more, or all, of the inner core 322 components of the energy storage device, including the internal electronics of the energy storage device 315, may be disposed within the inner casing 320. The system 310 further illustratively includes an outer layer 324 configured to surround the inner casing 320. The outer layer 324 may be an insulative layer made from an insulation material, such as WDS, for example. A pair of mounting brackets 323 pass through the outer layer 324, and are coupled to the inner casing 320 adjacent to opposite end surfaces 333, 334 of the inner core, to spatially suspend the inner casing 320 within the outer layer 324. FIG. 6 illustrates a inner core 320 configured to encapsulate two inner cores 322 of two energy storage devices 315, and an outer layer 324 configured to surround the inner casing 320. The illustrated exemplary embodiment of FIG. 6 shows a double stacked arrangement of the inner casings, but this multiple arrangement could be another multiple stacking of inner casing, such as side-to-side, for example. The inner casing 320 is not completely contained, as various components of the inner core 322, such as temperature sensors, for example penetrate the inner casing 320.

In between the outer layer 324 and the inner casing 320 is an inner space 326, which is configured to receive cooling fluid 328 through an inlet 318 in the outer layer 324. As illustrated in the end-view of FIG. 5, the inner space 326 surrounds the inner casing 320, which is attributed to the spacing of the outer layer 324 around the inner casing 320, although the outer layer 324 may have varying spacing from the inner casing 320. Additionally, FIG. 5 illustrates an outlet 336 in the outer layer 324, which is positioned adjacent to the inlet 318, however the outlet 336 may be positioned at another location along the outer layer 324. Although FIG. 5 illustrates one inlet and one outlet in the outer layer, more than one inlet and/or outlet may be positioned within the outer layer 324.

As illustrated in FIG. 5, the inner casing 320 can be a rectangular-shaped casing with six external surfaces 329, 330, 331, 332, 333, 334, including four side surfaces 329, 330, 331, 332 and two end surfaces 333, 334. Although the inner casing illustrated in FIG. 5 is a rectangular-shaped casing, the inner casing may take another shape, provided that outside air remains contained off from entering the interior of the inner core during convection of the cooling fluid along the external surfaces of the inner casing 320, in one embodiment.

Figure 7:
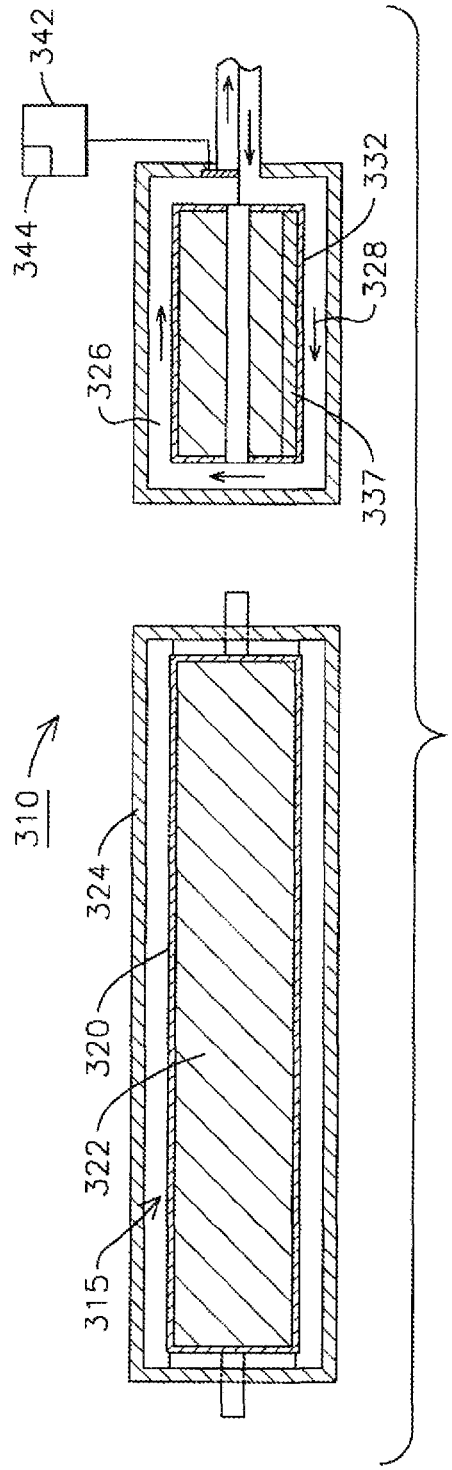
FIG. 7 is a cross-sectional side view and cross-sectional end view of an embodiment of a system for cooling an energy storage device of a hybrid electric vehicle.
Figure 8:
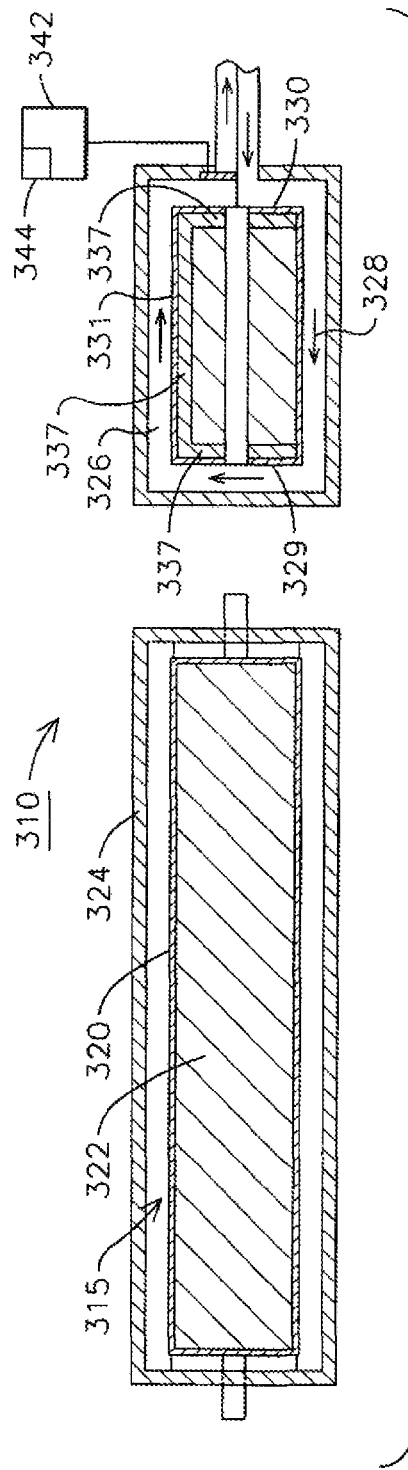
FIG. 8 is a cross-sectional side view and cross-sectional end view of an embodiment of a system for cooling an energy storage device of a hybrid electric vehicle.

As illustrated in the exemplary embodiment of FIG. 7, the inner casing 320 further includes an inner insulative layer 337 along any of the external surfaces of the inner casing, such as the bottom surface 332 illustrated in FIG. 7. Thus, the inner insulative layer 337 may cover a four-sided, two-sided, or another such multiple or single sided external surface of the inner casing. The inner insulative layer 337 is configured to control convection of the cooling fluid 328 along the bottom external surface 332 within the inner space 326. In the exemplary embodiment of FIG. 7, the bottom external surface 332 may be in more intimate contact with the inner cells of the energy storage device proximate to the bottom external surface 332, and thus the heat transfer properties of the bottom external surface 332 may be greater than the other external surfaces, resulting in an imbalance of convection of the bottom external surface with outside air within the inner space 326, as compared to the other external surfaces. Accordingly, by positioning the inner insulative layer 337 along the bottom external surface 332, the convection of outside air along each external surface of the inner casing 320 may be balanced out. As illustrated in the additional exemplary embodiment of FIG. 8, an inner insulative layer 337 may be positioned along three (i.e. more than one) external surfaces 329, 330, 331 of the inner casing 320, also to balance the convection of cooling fluid 328 within the inner space 326 among the external surfaces. Although FIGS. 7 and 8 illustrate inner insulative layers 337 of constant thickness between external surfaces and along each external surface, the inner insulative layer may have a varying thickness among external surfaces and/or a varying thickness along a single external surface, in order to stabilize the respective convection of cooling fluid along each respective external surface.

As illustrated in FIG. 5, a controllable outlet 341 is positioned within the outer layer 324. The controllable outlet 341 illustratively is a movable gate and is configured to selectively open and close the outlet 336 to control a flow of cooling fluid 328 within the inner space 326. Although FIGS. 5, 7-8 illustrate a movable gate, the controllable outlet may take several different forms which selectively open and close the outlet. Additionally, a controller 342 is coupled to the controllable outlet 341 and includes a stored upper or maximum temperature threshold and a lower or minimum temperature threshold in a memory 344. The upper and lower temperature thresholds may represent the upper and lower temperatures for which the cooling system respectively turns on and off. However, the system may not require any such upper and lower temperature thresholds. The controller 342 is configured to monitor the temperature of the inner core 320. The controller 342 is configured to close the controllable outlet 341 (i.e. close the movable gate) to cease the flow of cooling fluid 328 within the inner space 326 upon determining that the temperature of the inner core 320 is less than the lower temperature threshold stored in the memory 344. In the event that the controller 342 closes the controllable outlet 341 and shuts off the flow of cooling fluid 328, the outer insulative layer 324 serves to insulate the cooling fluid 328 within the inner space 326, and thus stabilizes the temperature of the cooling fluid 328 and the inner core 320 of the energy storage device 315 to achieve a thermal equilibrium. If the outer insulative layer 324 did not stabilize the temperature of the cooling fluid 328 with the temperature of the inner core 320, the inner core 320 may constantly lose heat energy from repeatedly heating up the cooling fluid 328, and may eventually require an unintended heating cycle.

The controller 342 is configured to open the controllable outlet 341, and initiate a flow of cooling fluid 328 within the inner space 326, upon the controller 342 determining that the temperature of the inner core 320 is greater than the upper temperature threshold stored in the memory 344. In an exemplary embodiment, the controllable inlet 318 and controllable outlet 341 may be a movable gate which may selectively open and closed by the controller 342 to control the flow of cooling fluid 328 into the inner space 326, for example. Upon the controller 342 initiating a flow of cooling fluid 328 within the inner space 326, each external surface 329, 330, 331, 332, 333, 334 of the inner casing 320 is configured to engage in convection with the cooling fluid 328 received through the inlet 318. In an exemplary embodiment of the system 310, the flow of cooling fluid 328 into the inlet 318 is based upon the motion of the locomotive, and thus the cooling fluid 328 enters the inner space 326 when the inlet 318 is open and the locomotive is in motion. A scoop device (not shown) may be attached external to the inlet 318 to assist in directing cooling fluid into the inner space 326 during motion of the vehicle. However, the flow of cooling fluid 328 may be independent of the motion of the vehicle, and instead be assisted by a blower powered by a motor and positioned adjacent to the inlet, for example.

Figure 9:
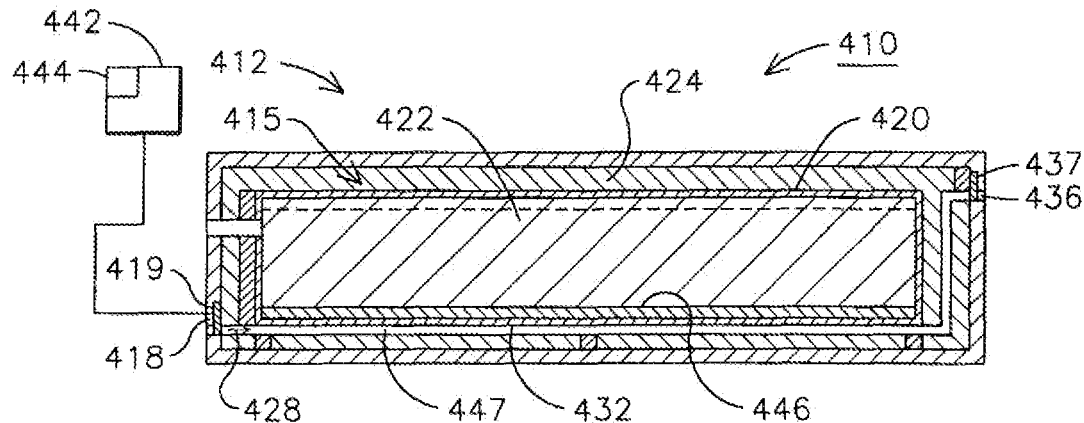
FIG. 9 is a cross-sectional side view of an embodiment of a system for cooling an energy storage device of a hybrid electric vehicle.
Figure 10:
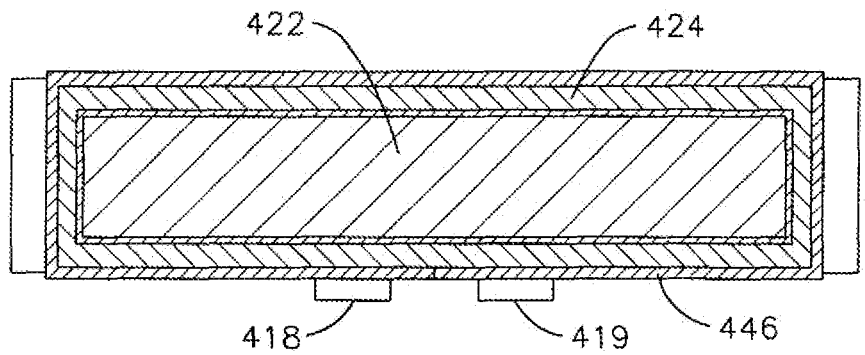
FIG. 10 is a cross-sectional top view of an embodiment of a system for cooling an energy storage device of a hybrid electric vehicle.

FIG. 9 illustrates an additional embodiment of a system 410 for cooling an energy storage system 412 of a vehicle. The energy storage system 412 includes one or more energy storage devices 415. Although FIG. 9 illustrates one energy storage device 415, the system 410 may be utilized with a plurality of energy storage devices 415. The system 410 illustratively includes an inner casing 420 configured to encapsulate an inner core 422 of an energy storage device 415 of the energy storage system 412. The inner core 422 of the energy storage device 415 may includes one or more components of the energy storage device, with the cooling ducts, inlets, and outlets removed. The inner casing 420 may form an air-tight containment around the inner core 422 of the energy storage device 415. One or more of the inner core 422 components of the energy storage device, including internal electronics, may be disposed within the inner casing 420.

Additionally, the system 410 includes a heat transfer surface 446 configured to thermally engage the bottom external surface 432 of the inner casing 420. The heat transfer surface 446 is illustratively positioned within the inner casing 420 and adjacent to the bottom external surface 432. The heat exchange surface 446 is configured to extract heat energy from within the inner core 422 to the heat exchange surface 446, for subsequent transfer of the extracted heat energy to cooling fluid during convection (discussed below). Although FIG. 9 illustrates the heat exchange surface 446 positioned within the inner casing 420 and along the bottom external surface 432 of the inner casing 420, the heat exchange surface may be positioned external to the inner casing and along the bottom external surface of the inner casing 420. Additionally, although FIG. 9 illustrates the heat exchange surface positioned along the bottom external surface of the inner casing, the heat exchange surface may be positioned along any external surface of the inner casing, or more than one external surface of the inner casing, provided that certain parameters are met related to the positioning of the inlet and the outlet of the cooling system, as described below. The heat exchange surface 446 may be one of a conducting material and a heat sink material, for example, or any material capable of extracting heat energy from the interior of the inner core for subsequent convection with cooling fluid, as described below. Additionally, a heat transfer liquid may be utilized in place of the heat exchange surface 446 within the inner casing 420 and within the inner core 422, to promote heat transfer to an external surface, such as the bottom external surface 432, for example.

As further illustrated in FIG. 9, an outer layer 424 is configured to surround each inner casing 420. The outer layer 424 may be an insulative layer made from an insulation material, such as WDS® and/or VAC, for example. An inlet 418 is illustratively positioned within the outer layer 424 and is configured to receive cooling fluid 428 within a cooling duct 447. The cooling duct 447 is configured to facilitate convection of the cooling fluid 428 with the heat exchange surface 446 adjacent to the bottom external surface 432. Since the heat exchange surface 446 has extracted the heat energy from within the inner core 422, the heat exchange surface heats up while the interior of the inner core 422 cools down. The cooling fluid 428 thermally engages the heat exchange surface 446 during motion of the vehicle, as the motion of the vehicle may force the cooling fluid into the inlet 418. Subsequent to the cooling fluid 428 undergoing convection with the heat exchange surface 446, the cooling fluid 428 passes through an outlet 436 positioned above the inlet 418. Since the outlet 436 is positioned above the inlet 418, the natural convection (i.e. chimney effect) of the cooling fluid 428 is facilitated. Accordingly, if the heat exchange surface 446 was repositioned to an alternate external surface of the inner casing 420, the outlet may need to be repositioned, based on the repositioning of the cooling duct and the inlet, to ensure that the height difference of the outlet above the inlet is maintained. Although FIG. 9 illustrates one inlet and one outlet within the outer layer 424, more than one inlet, outlet and cooling duct may be utilized.

FIG. 9 illustrates a controllable inlet 419 positioned in the outer layer 424 and configured to selectively open and close the inlet 418 to control a flow of cooling fluid 428 within the cooling duct 447. A controller 442 is illustratively coupled to the controllable inlet 419 with a stored lower or minimum temperature threshold and a stored upper or maximum temperature threshold in a memory 444. The upper and lower temperature thresholds represent the upper and lower temperatures for which the cooling system respectively turns on and off. However, the system 410 may not require any such upper and lower temperature thresholds to operate. The controller 442 is configured to monitor a temperature of the inner core 422. FIG. 9 further illustrates a controllable outlet 437 in the outer layer 424 positioned above the controllable inlet 419 and configured to selectively open and close with the controllable inlet 419. In an exemplary embodiment, the controllable inlet and controllable outlet may be a movable gate which may be selectively open and closed by the controller to control the flow of cooling fluid into the inner space, for example, but other mechanisms to selectively open and close the respective inlets and outlets may be utilized. The controller 442 is configured to close the inlet 418, and cease the flow of cooling fluid 428 within the cooling duct 447 upon the controller 442 determining that the inner core 422 temperature is less than the lower temperature threshold.

In the event that the controller ceases the flow of cooling fluid 428 within the cooling duct 447, the outer insulative layer 424 is configured to insulate the cooling fluid 428 with the cooling duct 447 and thus stabilize the temperature of the cooling fluid 428 and the inner core 422 of the energy storage device 415 to achieve a thermal equilibrium. The controller 442 is configured to open the inlet 418, and initiate a flow of cooling fluid 428 within the cooling duct 447 upon the controller 442 determining that the inner core 422 temperature is greater than the upper temperature threshold.

Figure 11:
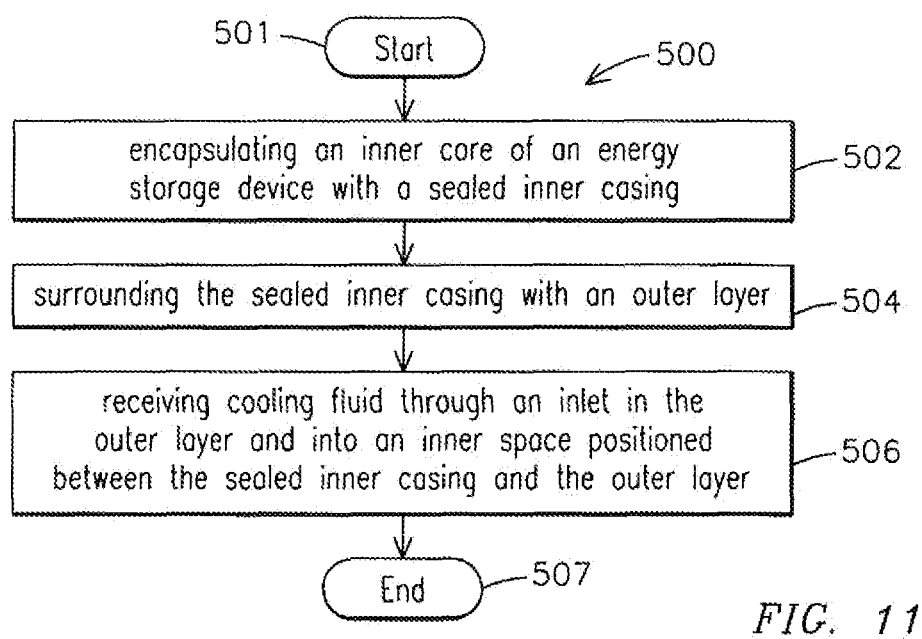
FIG. 11 is an exemplary embodiment of a method for cooling an energy storage system of a hybrid electric vehicle.

FIG. 11 illustrates an exemplary embodiment of a method 500 for cooling an energy storage system 312 of a vehicle, where the energy storage system 312 includes one or more energy storage devices 315. The method 500 begins (block 501) by encapsulating (block 502) an inner core 322 of an energy storage device 315 with an inner casing 320, followed by surrounding (block 504) the inner casing 320 with an outer layer 324. The method further includes receiving (block 506) cooling fluid through an inlet 318 in the outer layer 324 and into an inner space 326 positioned between the inner casing 320 and the outer layer 324.

Figure 12:
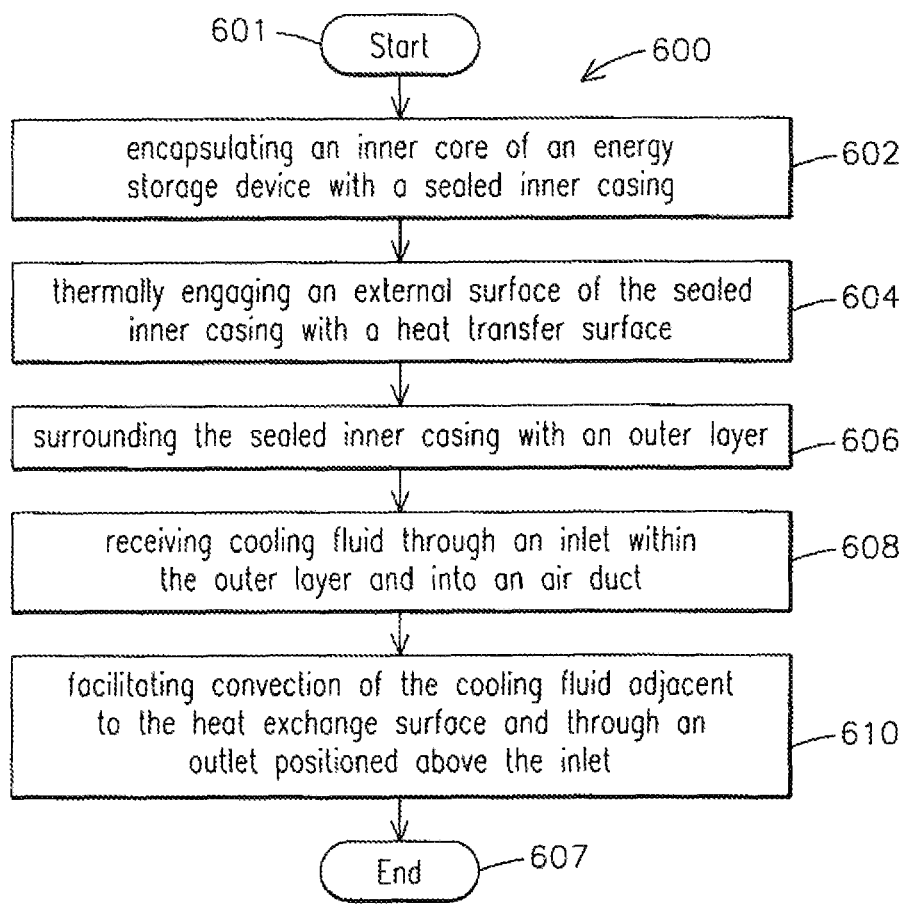
FIG. 12 is an exemplary embodiment of a method for cooling an energy storage system of a hybrid electric vehicle.

FIG. 12 illustrates an exemplary embodiment of a method 600 for cooling an energy storage system 412 of a vehicle, where the energy storage system 412 includes one or more energy storage devices 415. The method 600 begins (block 601) by encapsulating (block 602) an inner core 422 of an energy storage device 415 with an inner casing 420. The method 600 further includes thermally engaging (block 604) an external surface 432 of the inner casing 420 with a heat transfer surface 446. The method 600 further includes surrounding (block 606) the inner casing 420 with an outer layer 424, and receiving (block 608) cooling fluid 428 through an inlet 418 within the outer layer 424 and into an cooling duct 447. The method further includes facilitating convection (block 610) of the cooling fluid 428 adjacent to the heat exchange surface 446 and through an outlet 436 positioned above the inlet 418.

Figure 13:
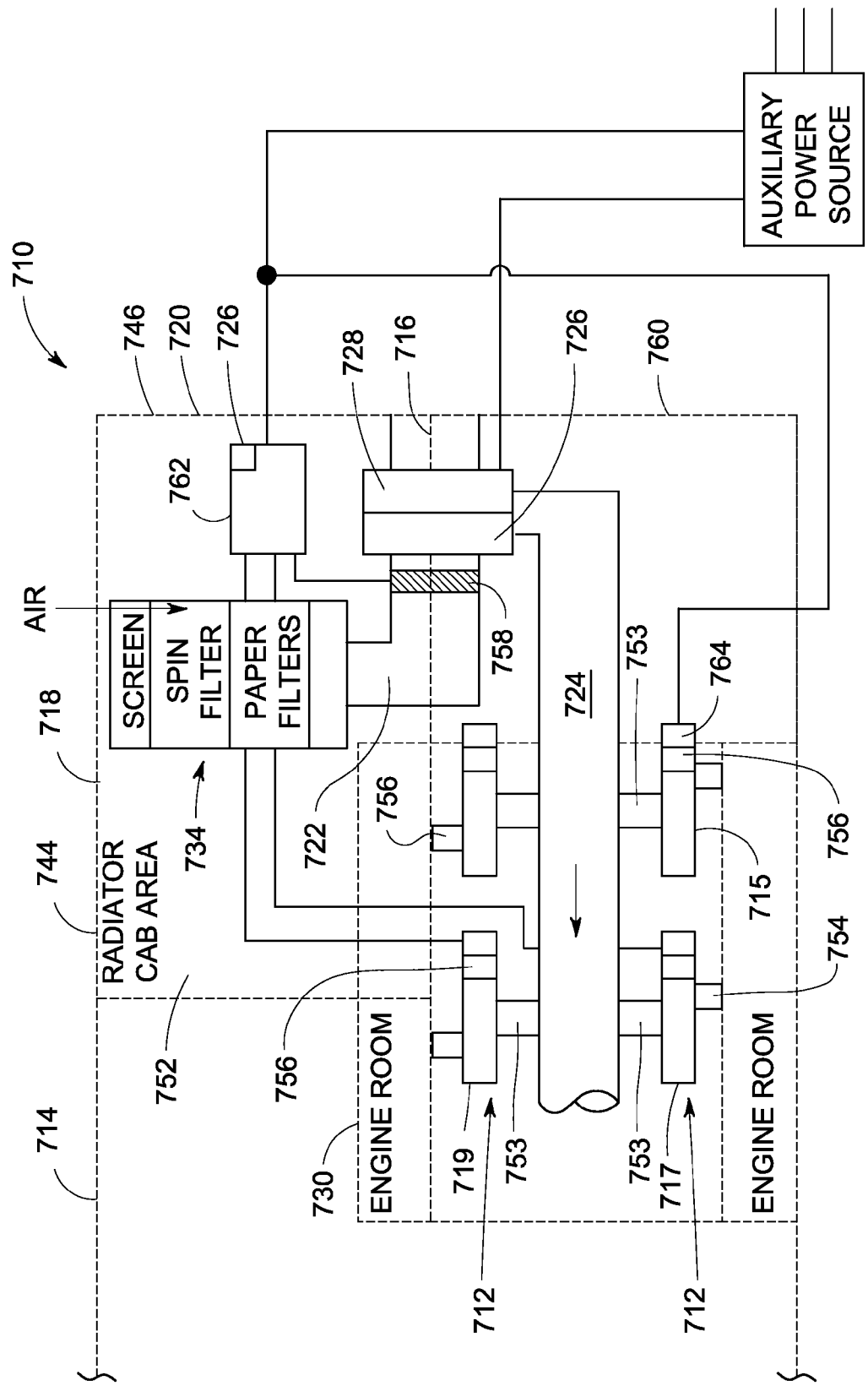
FIG. 13 is a cross-sectional side view of an embodiment of a system for cooling an energy storage system of a hybrid electric vehicle.

FIG. 13 illustrates an embodiment of a system 710 for cooling an energy storage system 712 of a vehicle 714. The energy storage system 712 illustratively includes a plurality of energy storage devices 715, including a first energy storage device 717 having an upper temperature 721 and a second energy storage device 719 having a lower or minimum temperature 723 among the energy storage devices. In the illustrated embodiment, the vehicle 714 includes a roof portion 744 that may be similar to the roof portion 44 (shown in FIG. 2), side portions 746 that may be similar to the side portions 46 (shown in FIG. 2), a radiator area 752 that may be similar to the radiator area 52 (shown in FIG. 2), and an engine compartment 730 that may be similar to the engine compartment 30 (shown in FIG. 2). Although FIG. 13 illustrates the energy storage devices 715 positioned below a platform 716 of the vehicle 714, the energy storage devices 715 may be positioned on or above the platform 716.

The exemplary embodiment of the system 710 illustrated in FIG. 13 further includes an interior duct 724 in flow communication with an inlet 718 and the energy storage devices 715. The inlet 718 is in the exemplary embodiment of FIG. 13 is positioned along an outer surface 720 of the vehicle 714 and above the platform 716, but may be positioned at any location along the outer surface, either above or below the platform 716, and/or on another outer surface 760 of the vehicle 714. Additionally, the system 710 includes a blower 726 positioned within the interior duct 724 to draw cooling fluid, such as outside air, into the inlet 718 and through the interior duct 724 to pass the cooling fluid over or through one or more of the energy storage devices 715. The system 710 shown in FIG. 13 includes a filtering location 734 that may include one or more filter media, similar to the filtering location 34 and filtering media 32 shown in FIG. 2. The system 710 also includes an inlet duct 722 that may be similar to the inlet duct 22 (shown in FIG. 2), a damper control device 758 that may be similar to the damper control device 58 (shown in FIG. 2), duct couplings 753 that may be similar to the duct couplings 53 (shown in FIG. 2), and/or vent couplings 754 that may be similar to the vent couplings 54 (shown in FIG. 2)

Additionally, as illustrated in the exemplary embodiment of FIG. 13, the system 710 further includes a controller 762 coupled with each energy storage device 715. The controller 762 may be coupled to a respective temperature sensor 764 of each energy storage device 715. The controller 762 is configured to increase the temperature of one or more energy storage devices 715 whose temperature is below the upper temperature 721 reduced by a predetermined threshold stored in a memory 763 of the controller 762. For example, if the first energy storage device 717 has an upper temperature 721 of 300 degrees Celsius, and the stored predetermined threshold in the memory 763 of the controller 762 is 15 degrees Celsius, the controller 762 proceeds to increase the temperature of one or more of the energy storage devices 715 having a temperature less than 285 degrees Celsius, using one or more of a variety of heat sources, as described below. However, the exemplary embodiment of a first energy storage device 717 with an upper temperature of 300 degrees Celsius is merely an example and the first energy storage device 717 may have another upper temperature 721 value. The controller 762 illustrated in the exemplary embodiment of FIG. 13 is configured to monitor the temperature of one or more of the energy storage devices 715, such that the controller activates the blower 726 when the temperature of one or more energy storage devices 715 exceeds the upper temperature threshold. Additionally, the controller may deactivate the blower 726 when the temperature of one or more energy storage devices 715 falls below the lower temperature threshold.

Although FIG. 13 illustrates one interior duct communicatively coupled to one inlet, one blower positioned within the interior duct, and one controller coupled to each energy storage device, more than one interior duct may be communicatively coupled to a respective inlet, more than one blower may be respectively positioned within each interior duct, and more than one controller may be coupled to each energy storage device.

Figure 14:
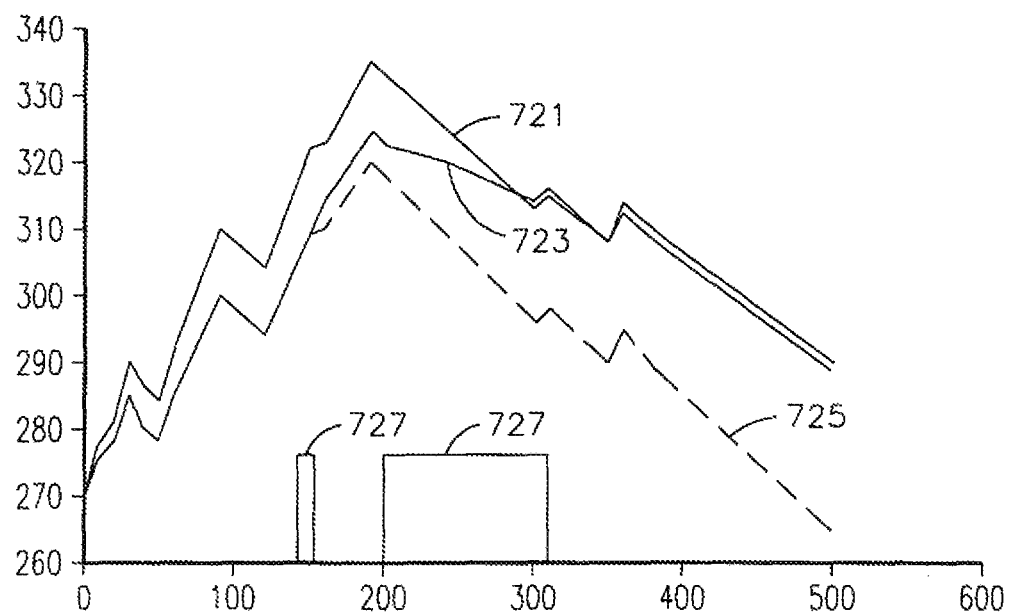
FIG. 14 is a timing diagram illustrating an embodiment of an upper temperature and a lower temperature of a first energy storage device and a second energy storage device of an embodiment of a cooling system for an energy storage system.

FIG. 14 illustrates an exemplary timing diagram of the upper temperature 721 and lower temperature 723 of the respective first energy storage device 717 and the second energy storage device 719 of the energy storage system 712. As illustrated in the exemplary timing diagram of FIG. 14, at approximately t=150, the controller 762 proceeds to increase the temperature of the second energy storage device 719, as indicated by the on/off heating waveform 727 of the controller, representative of a signal from the controller 762 to a heat device 756 of the second energy storage device 719, to heat the second energy storage device 719, as discussed below. In the exemplary embodiment of FIG. 14, the controller 762 is configured to increase the temperature of the second energy storage device 719 having the lower temperature 723, since the lower temperature 723 at t=150 is less than the upper temperature 721 reduced by a predetermined threshold stored in the memory 763, such as 10 degrees, for example. The controller 762 is configured to increase the temperature of the second energy storage device 719 (and any energy storage device 715 which meets the proper criteria) to within a predetermined range, such as 5 degrees Celsius, for example, of the upper temperature 721. In the exemplary embodiment of FIG. 14, the controller 762 increases the temperature of the second energy storage device 719 periodically until approximately t=310, when the lower temperature 723 is within a predetermined range, such as 5 degrees Celsius, for example, of the upper temperature 721. The controller 762 may manually increase the temperature of each energy storage device 715 which meets the above criteria, based on manually assessing the temperature difference between the temperature of each energy storage device and the upper temperature 721 with the temperature threshold at each time increment. As illustrated in FIG. 14, if the controller 762 were not to increase the temperature of the second energy storage device 719, the lower temperature 723 curve would instead have taken the alternative lower temperature 725 curve illustrated in FIG. 14, and the operating range of the energy storage system, measured by the temperature difference between the upper temperature 721 and the lower temperature 725 would be noticeably greater than the reduced operating range of the temperature difference between the upper temperature 721 and the lower temperature 723. In the exemplary timing diagram of FIG. 14, the time rate of change of the upper temperature 721 and lower temperature 723 is dependent on the blower speed 726, an energy load on each energy storage device 715 and an ambient temperature of each energy storage device 715.

As discussed above, when the controller 762 increases the temperature of an energy storage device, the controller 762 is configured to activate a heat device 756, such as a heating circuit, for example, of each energy storage device 715. The controller 762 supplies heat energy from the traction motors of the locomotive 714 to each heat device 756 during a dynamic braking mode of the locomotive. However, in an exemplary embodiment, the controller 762 may be configured to activate the heat device 756, such as a heating circuit, for example, of each energy storage device 715, with heat energy supplied from a vehicle engine during a motoring mode or idle mode of the vehicle, for example.

Within the memory 763 of the controller 762, the identity of particular energy storage devices 715 having a history of consistently lower temperatures relative to the other energy storage devices may be stored. During operation of the system 710, the controller 762 may be configured to increase the temperature of those previously identified energy storage devices 715 stored in the memory 763 with a previous history of low temperature, from below the upper temperature 721 reduced by the predetermined threshold to greater than the upper temperature 721 increased by a predetermined range. Thus, the controller 762 is configured to overcorrect for those energy storage devices 715 having a previous history of lower temperature by heating those energy storage devices 715 beyond the upper temperature 721 in anticipation that their temperature will fall lower than expected. The controller 762 is configured to increase the temperature of the energy storage devices 715 identified with a previous history of low temperature during a dynamic braking mode with heat energy supplied from traction motors of the vehicle, but may increase their temperature during a motoring mode or idle mode with heat energy supplied from the vehicle engine.

The controller 762 is configured to preheat the temperature of each energy storage device 715 with a temperature lower than the upper temperature 721 reduced by the predetermined threshold to within a predetermined range of the upper temperature. For example, the controller 762 may preheat the temperature of an energy storage device 715 from a temperature of 280 degrees Celsius, lower than the upper temperature of 330 degrees Celsius reduced by a predetermined threshold of 10 degrees Celsius, to 325 degrees Celsius, or to within a predetermined range of 5 degrees of the upper temperature of 330 degrees. The controller 762 is configured to preheat each energy storage device 715 during a dynamic braking mode and prior to the termination of a dynamic braking mode of the vehicle.

In addition to preheating an energy storage device, as discussed above, the controller 762 may be additionally configured to precool the temperature of each energy storage device 715 from a temperature above the lower temperature 723 raised by the predetermined threshold to within a predetermined range of the lower temperature. For example, the controller 762 may precool an energy storage device from a temperature of 320 degrees Celsius, since this temperature is above a lower temperature of 270 degrees Celsius raised by a predetermined threshold of 10 degrees Celsius, and the controller 762 may precool the energy storage device to 275 degrees Celsius, or to within a predetermined range of 5 degrees Celsius of the lower temperature of 270 degrees Celsius. The controller 762 may be configured to precool each energy storage device 715 prior to an encountering an upcoming anticipated dynamic braking mode, since an upcoming opportunity to heat the energy storage devices is imminent.

Each energy storage device 715 has a state of charge, and the controller 762 is configured to preheat the temperature of each energy storage device 715. The preheating may be based on state of charge. The description above is based on previous history, it is also possible to obtain a transfer function of the heat dissipation/temperature excursion based on the state of charge of the storage device (for example high state of charge, or SOC, devices tend to transfer heat faster, while low SOC devices may be heated to compensate for the differing temperature). Another option is that the designated or optimum operating temperature of each energy storage device is a function of the SOC. Accordingly, the difference in the SOC may be adjusted instead of the temperature difference between the upper temperature and the lower temperature.

Figure 15:
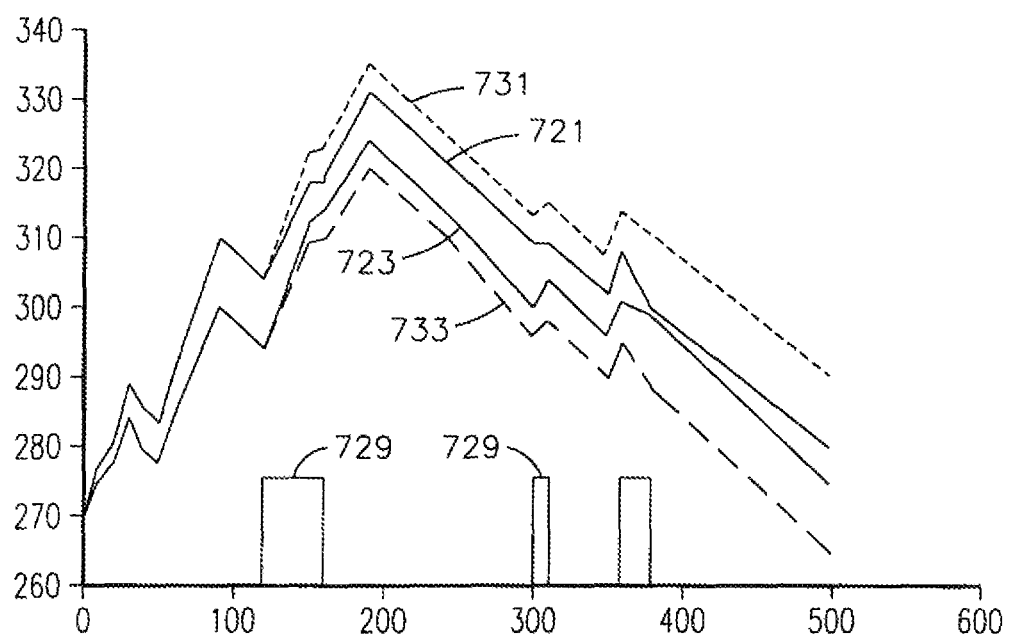
FIG. 15 is a timing diagram illustrating an embodiment of an upper temperature and a lower temperature of a first energy storage device and a second energy storage device of an embodiment of a cooling system for an energy storage system.

FIG. 15 illustrates an additional embodiment of the system 710, in which the controller 762 is configured to disconnect each energy storage device 715 from the energy storage system 712 having a temperature above the upper temperature 721 lowered by the predetermined threshold. Upon disconnecting each of the energy storage devices 715 which meet the above criteria, the controller 762 is configured to increase the temperature of each energy storage device 715 with a temperature lower than the upper temperature 721 reduced by the predetermined threshold. In an exemplary embodiment, if the upper temperature is 300 degrees Celsius, the lower temperature is 270 degrees Celsius, and the predetermined threshold is 10 degrees Celsius, the controller 762 is configured to disconnect each energy storage device 715 with a temperature above 290 degrees Celsius and is further configured to increase the temperature of each energy storage device 715 with a temperature lower than 290 degrees Celsius. In an additional exemplary embodiment, the controller may be configured to disconnect the first energy storage device 717 having a greater temperature than the upper temperature and increase the temperature of the second energy storage device 719 having a temperature lower than the lower temperature. The controller 762 is configured to disconnect each energy storage device 715 with the previously discussed criteria and increase each energy storage device 715 with the previously discussed criteria during a low power demand on each energy storage device. The low power demand on each energy storage device 715 may take place during a dynamic or brake propulsion mode of the vehicle 714 For example, if the vehicle 714 demands 400 horsepower (HP) in secondary energy from 40 energy storage devices, thus amounting to 10 HP per energy storage device, if the controller 762 disconnects 20 energy storage devices with the hottest temperatures, the remaining 20 energy storages devices may take on twice their previous load, or 20 HP each, thereby increasing the respective temperatures of the energy storage devices. Accordingly, the controller 762 is configured to increase the temperature of one or more energy storage devices 715 meeting the above criteria by increasing the power demand on each energy storage device 715. However, the controller 762 may increase the temperature of the energy storage devices from the energy storage system using methods other than increasing the respective loads of each energy storage device. During a dynamic braking mode, the heat energy may be supplied from traction motors of the vehicle, which is then supplied to the respective heating devices 756 of each energy storage device 715. Alternatively, the low power demand on each energy storage device 715 may take place during a motoring mode or idle mode, in which case the heat energy supplied to each respective heating device 756 may come from the vehicle engine.

As illustrated in the exemplary timing diagram of FIG. 15, the controller 762 disconnects the first energy storage device 717 from the energy storage system 712 at approximately t=100, since the upper temperature 721 exceeds the upper temperature reduced by the predetermined threshold. At the same time, the controller 762 begins to increase the temperature of the second energy storage device 719, since the lower temperature 723 is below the upper temperature 721 reduced by the predetermined threshold (e.g. 10 degrees Celsius). Although the first energy storage device 717 is disconnected from the energy storage system 712, the upper temperature 721 remains tracked by the controller 762 and plotted in FIG. 15. The activation of the heating device 756 within the second energy storage device 719 is depicted by the waveform 729 at approximately t=120, 300 and 360. As illustrated in the exemplary embodiment of FIG. 15, the controller 762 is configured to reduce or minimize the difference between the upper temperature 721 and the lower temperature 723 over time for the respective energy storage device 717, 719. This reduction or minimization is depicted when comparing the upper temperature 721 and lower temperature 723 curves after the controller 762 disconnected the first energy storage device 717 and increased the temperature of the second energy storage device 719, with the lower temperature 733 curve and the upper temperature 731 curve which may result if the controller 762 did not disconnect or heat the respective energy storage device 717, 719. As shown in FIG. 15, the operating range of the energy storage system 712, measured by the temperature difference between the upper temperature 721 and the lower temperature 723 is noticeably reduced after the controller 762 disconnected the first energy storage device 717 and increased the temperature of the second energy storage device 719. Although FIG. 15 depicts the controller 762 having disconnected and increased the energy of a single energy storage device 717, 719, the controller may disconnect multiple energy devices and increase the temperature of multiple energy devices, so to narrow the operating temperature range of the energy storage system. Accordingly, the exemplary diagram of FIG. 15 includes exemplary values and ranges, and the embodiments of the invention are not limited to any exemplary values or ranges shown in FIG. 15, or any other exemplary diagram of the present application.

Figure 16:
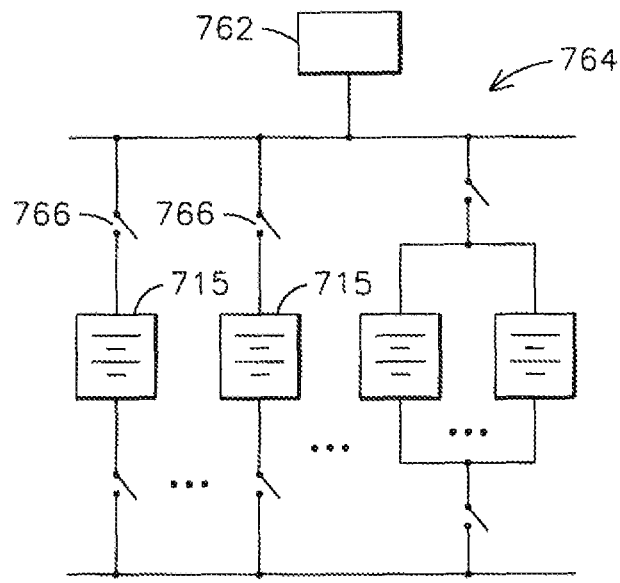
FIG. 16 is a block diagram of an exemplary embodiment of an energy storage system.

As illustrated in the exemplary embodiment of FIG. 16, the controller 762 is configured to disconnect one or more energy storage devices 715. The controller may be coupled to a parallel bus circuit 764, where each parallel bus circuit includes one or more switches 766 configured to selectively connect each energy storage device 715 in a parallel arrangement within each parallel bus circuit 764. The controller 762 is configured to selectively switch on and off each switch 766 to respectively connect and disconnect each energy storage device 715 from the energy storage system 712, as disclosed previously.

Figure 17:
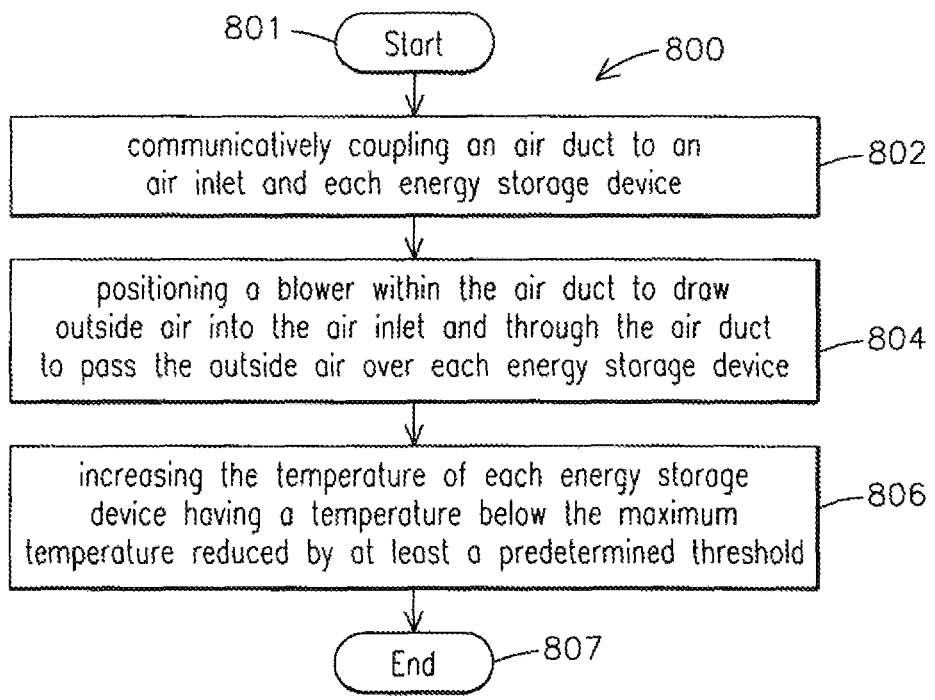
FIG. 17 is an exemplary embodiment of a method for cooling an energy storage system of a hybrid electric vehicle.

FIG. 17 illustrates an exemplary embodiment of a method 800 for cooling an energy storage system 712 of a vehicle 714. The energy storage system 712 includes a plurality of energy storage devices 715, including a first energy storage device 717 having an upper temperature 721 and a second energy storage device 719 having a lower temperature 723. The method 800 begins (block 801) by communicatively coupling (block 802) an interior duct 724 to an inlet 718 and one or more of the energy storage devices 715. The method 800 further includes positioning (block 804) a blower 726 within the interior duct 724 to draw cooling fluid (such as outside air) into the inlet 718 and through the interior duct 724 to pass the cooling fluid over or through each energy storage device 715. The method further includes increasing (block 806) the temperature of one or more energy storage devices 715 having a temperature below the upper temperature 721 reduced by at least a predetermined threshold, before ending at block 807.

Figure 18:
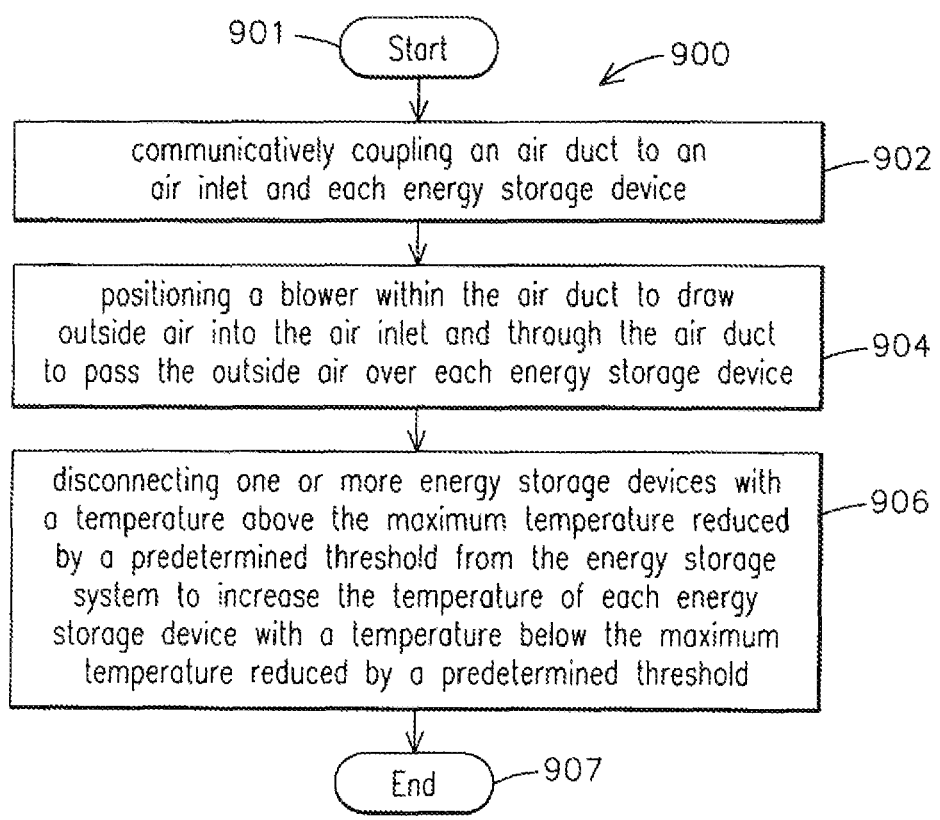
FIG. 18 is an exemplary embodiment of a method for cooling an energy storage system of a hybrid electric vehicle.

FIG. 18 illustrates an exemplary embodiment of a method 900 for cooling an energy storage system 712 of a vehicle 714. The energy storage system 712 includes a plurality of energy storage devices 715, including a first energy storage device 717 having an upper or maximum temperature 721 and a second energy storage device 719 having a lower or minimum temperature 723. The method 900 begins (block 901) by communicatively coupling (block 902) an interior duct 724 to an inlet 718 and one or more of the energy storage devices 715. The method 900 subsequently involves positioning (block 904) at least one blower 926 within the interior duct 924 to draw cooling fluid, such as outside air, into the inlet 718 and through the interior duct 924 to pass the cooling fluid over or through one or more of the energy storage devices 715. The method further includes disconnecting (block 906) one or more energy storage devices 715 with a temperature above the upper temperature 721 reduced by a predetermined threshold from the energy storage system 712 to increase the temperature of one or more of the energy storage devices 715 with a temperature below the upper temperature 721 reduced by a predetermined threshold, before ending at block 907.

Based on the foregoing specification, the above-discussed embodiments of the invention may be implemented using computer programming or engineering techniques including computer software, firmware, hardware or any combination or subset thereof, wherein the technical effect is to cool each energy storage device of a hybrid diesel electric vehicle. Any such resulting program, having computer-readable code means, may be embodied or provided within one or more computer-readable media, thereby making a computer program product, i.e., an article of manufacture, according to the discussed embodiments of the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

In an embodiment, software as described herein is combined with appropriate general purpose or special purpose computer hardware, such as a microprocessor, to create a computer system or computer sub-system of the method embodiment of the invention. An apparatus for making, using or selling embodiments of the invention may be one or more processing systems including, but not limited to, a central processing unit (CPU), memory, storage devices, communication links and devices, servers, I/O devices, or any subcomponents of one or more processing systems, including software, firmware, hardware or any combination or subset thereof, which embody those discussed embodiments the invention.

This written description uses examples to disclose embodiments of the invention, including the best mode, and also to enable a person of ordinary skill in the art to make and use the embodiments of the invention. The patentable scope of the embodiments of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

That which is claimed is:

1. A system comprising:
    an interior duct configured to be fluidly coupled with an inlet that receives a cooling fluid into a vehicle and with an energy storage device disposed in the vehicle;
    a blower configured to be fluidly coupled with the interior duct to draw the cooling fluid through the interior duct and to cause a first portion of the cooling fluid to flow into contact with at least a portion of the energy storage device;
    a vent coupling configured to be fluidly coupled with the energy storage device and a vented area of the vehicle, the vent coupling configured to direct the first portion of the cooling fluid that flowed at least one of over or through the energy storage device into the vented area; and
    a secondary duct configured to be fluidly coupled with the vent coupling and with the interior duct, the secondary duct configured to direct a second portion of the cooling fluid from the interior duct into the vent coupling to mix with the first portion of the cooling fluid after the first portion of the cooling fluid has flowed in contact with at least a portion of the energy storage device.

2. The system of claim 1, wherein the secondary duct is configured to direct the second portion of the cooling fluid to bypass the energy storage device and flow into the vented area of the vehicle.

3. The system of claim 1, wherein the secondary duct is configured to mix the first portion of the cooling fluid with the second portion of the cooling fluid before the first portion and the second portion flow into the vented area of the vehicle.

4. The system of claim 1, wherein the vehicle is at least one of a rail vehicle, a marine vessel, mining equipment, an automobile, or a bus.

5. The system of claim 1, wherein the cooling fluid includes air and the blower is configured to draw the air through the interior duct and at least one of over or through the energy storage device.

6. The system of claim 1, wherein the cooling fluid includes air and the blower is configured to draw the air from outside of the vehicle into the interior duct through the inlet.

7. The system of claim 1, further comprising a filtering medium configured to be fluidly coupled with the inlet and the interior duct, the filtering medium configured to remove at least one contaminant from the cooling fluid prior to the cooling fluid flowing at least one of over or through the energy storage device.

8. The system of claim 1, wherein the vented area comprises an engine compartment of the vehicle.

9. The system of claim 1, further comprising a damper configured to selectively open or close to allow or prevent flow of the cooling fluid at least one of over or through the energy storage device.

10. The system of claim 9, wherein the damper is configured to be disposed between the energy storage device and the blower.

11. The system of claim 9, wherein the damper is configured to be disposed between the inlet and the blower.

12. The system of claim 1, further comprising a controller configured to monitor a temperature of the energy storage device, wherein the controller controls the blower based on the temperature of the energy storage device.

13. The system of claim 12, wherein the controller is configured to activate the blower when the temperature of the energy storage device rises above an upper temperature threshold.

14. The system of claim 12, wherein the controller is configured to deactivate the blower when the temperature of the energy storage device falls below a lower temperature threshold.

15. A method comprising:
    fluidly connecting an interior duct with an inlet and an energy storage device disposed in a vehicle, the inlet configured to receive a cooling fluid into the vehicle;
    fluidly connecting a blower with the interior duct so that the blower is positioned to draw the cooling fluid through the interior duct and to cause a first portion of the cooling fluid to flow at least one of over or through the energy storage device;

fluidly connecting a vent coupling with the energy storage device and a vented area of the vehicle, the vent coupling configured to direct the first portion of the cooling fluid that flowed at least one of over or through the energy storage device into the vented area; and fluidly connecting a secondary duct with the vent coupling and with the interior duct, the secondary duct configured to direct a second portion of the cooling fluid from the interior duct into the vent coupling to mix with the first portion of the cooling fluid after the first portion of the cooling fluid has flowed in contact with at least a portion of the energy storage device.

16. The method of claim 15, wherein fluidly connecting the secondary duct includes positioning the secondary duct so that the second portion of the cooling fluid bypasses the energy storage device and flows into the vented area of the vehicle.

17. The method of claim 15, wherein fluidly connecting the secondary duct includes coupling the secondary duct so that the first portion of the cooling fluid is mixed with the second portion of the cooling fluid before the first portion and the second portion flow into the vented area of the vehicle.

18. The method of claim 15, wherein the cooling fluid is air and fluidly connecting the interior duct includes coupling the interior duct with the inlet that is positioned to draw the air front outside of the vehicle.

19. The method of claim 15, further comprising fluidly connecting a filtering medium with the inlet and the interior duct, the filtering medium configured to remove at least one contaminant from the cooling fluid prior to the cooling fluid flowing at least one of over or through the energy storage device.

20. The method of claim 15, further comprising providing a damper that is configured to selectively open or close to allow or prevent flow of the cooling fluid at least one of over or through the energy storage device.

21. The method of claim 15, further comprising providing a controller that is configured to monitor a temperature of the energy storage device and to control the blower based on the temperature of the energy storage device.

* * * * *